(12) United States Patent
Szedo

(10) Patent No.: US 7,984,091 B1
(45) Date of Patent: Jul. 19, 2011

(54) QUADRATIC APPROXIMATION FOR FAST FOURIER TRANSFORMATION

(75) Inventor: Gabor Szedo, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1651 days.

(21) Appl. No.: 11/250,741

(22) Filed: Oct. 14, 2005

(51) Int. Cl.
*G06F 1/02* (2006.01)
(52) U.S. Cl. ........ 708/276; 708/270; 708/271; 708/290; 708/313
(58) Field of Classification Search .................. 708/271; 327/105–107
See application file for complete search history.

(56) References Cited

U.S. PATENT DOCUMENTS

| | | | | |
|---|---|---|---|---|
| 3,590,229 | A * | 6/1971 | Humphreys | 708/443 |
| 4,905,177 | A * | 2/1990 | Weaver et al. | 708/276 |
| 5,043,933 | A * | 8/1991 | Boutaud et al. | 708/313 |
| 5,309,382 | A * | 5/1994 | Tamura et al. | 708/209 |

OTHER PUBLICATIONS

Author: Presti et al.; Title: "A direct digital frequency synthesizer using an IIR filter implemented with a DSP microprocessor"; Date: Apr. 22, 1994; URL: http://ieeexplore.ieee.org/search/wrapper.jsp?arnumber=390055.*
Author: Ohta et al.; Title: "A New High Logic Density FPGA for Bit-Serial Pipeline Datapath"; Date: Nov. 27, 1998; URL: http://ieeexplore.ieee.org/search/wrapper.jsp?arnumber=743931.*
Author: Tan et al.; Title: "A 200 MHz quadrature digital synthesizer/mixer in 0.8 μm CMOS"; Date: Mar. 1995; URL: http://ieeexplore.ieee.org/xpls/abs_all.jsp?arnumber=364432.*

Author: Schnase et al.; Title: "An RF-Synthesizer for Fundamental and Precisely Adjusted Higher Harmonics"; Date: Jul. 1, 1994; URL: http://accelconf.web.cern.ch/AccelConf/e94/HTML/TOC.HTM; Pertinent pp. 1963-1965.*
Author: Palomäki et al.; Title: "A low-power, memoryless direct digital frequency synthesizer architecture"; Date: May 28, 2003; URL: http://ieeexplore.ieee.org/xpls/abs_all.jsp?arnumber=1205893.*
Author: Langlois et al.; Title: "Phase to sinusoid amplitude conversion techniques for direct digital frequency synthesis"; Date: Dec. 15, 2004; URL: http://ieeexplore.ieee.org/xpls/abs_all.jsp?arnumber=1387797.*
Author: Fanucci et al.; Title: "A Sine Wave Digital Synthesizer Based on a Quadratic Approximation"; Date: 2001; URL: http://ieeexplore.ieee.org/xpls/abs_all.jsp?arnumber=956385.*

(Continued)

*Primary Examiner* — Lewis A Bullock, Jr.
*Assistant Examiner* — Michael Yaary
(74) *Attorney, Agent, or Firm* — W. Eric Webostad; John J. King; Thomas George

(57) ABSTRACT

Interpolators for quadratic approximation for sinusoids are described. A sample source providing first order derivatives of sub-sampled sets of phase factor samples is used. A differentiator is coupled to receive the first order derivatives and configured to provide second order derivatives of the first order derivatives. A first scaling device is coupled to receive each of the first order derivatives. A second differentiator is coupled to receive each of the first order derivatives and configured to respectively provide second order derivatives of the first order derivatives. A second scaling device is coupled to receive the second order derivatives. A first integrator is coupled to receive output from the first scaling device for preloading, and to receive output from the second scaling device for integration. A third scaling device is coupled to receive output from the first integrator. A second integrator is coupled to receive output from the third scaling device.

19 Claims, 15 Drawing Sheets

OTHER PUBLICATIONS

Author: Goldberg; Title: "Digital Frequency Synthesis Demystified"; Date: 1999; Pertinent Sections: 7-3 & 7-4; URL: http://download.fztvseries.mobi/attachments/ebooks/Electronics%20ebook%20collection%201/LLH%20Technology%20-%20%20Digital%20Frequency%20Synthesis%20Demystified.pdf.*

Tierney, J. et al., "A Digital Frequency Synthesizer", IEEE Transactions on Audio Electroacoustics, Mar. 1971, pp. 48-57, vol. AU-19, available from IEEE, 3 Park Avenue, 17th Floor, New York, NY 10016-5997.

Meitzler, Richard C., et al. "A Direct Digital Frequency Synthesizer Prototype for Space Applications", 11th Annual NASA Symposium on VLSI Design—Coeur d'Alene, Idaho, May 28-29, 2003, pp. 1-5, available from Johns Hopkins University Applied Physics Laboratory, 11100 Johns Hopkins Road, Laurel, MD 20723.

Fu, Dengwei, et al., "A High-Speed Processor for Digital Sine/Cosine Generation and Angle Rotation", Conference Record of the Thirty-Second Asilomar Conference on Signals, Systems & Computers, Nov. 1-4, 1998, pp. 177-181, vol. 1, available from University of California, Electrical Engineering Department, 405 Hilgard Avenue, Los Angeles, 90095.

Langlois, J.M. Pierre, "Novel Approach to the Desing of Direct Digital Frequency Synthesizers Based on Linear Interpolation", IEEE-Transactions on Circuits and Systems—II: Analog and Digital Signal Processing, pp. 567-578, vol. 50, No. 9, Sep. 2003, available from IEEE, 3 Park Avenue, 17th Floor, New-York, NY 10016-5997.

Vankka, Jouko, "Methods of Mapping From Phase to Sine Amplitude in Direct Digital Synthesis", IEEE Transaction on Ultrasonics, Ferroelectrics and Frequency Control, pp. 526-534, vol. 44, No. 2, Mar. 1997, available from IEEE, 3 Park Avenue, 17th Floor, New York, NY 10016-5997.

Xilinx, Inc., Product Specification, DDS v.4.2, DS246, pp. 1-26, v1.5, Mar. 28, 2003, available from Xilinx, Inc., 2100 Logic Drive, San Jose, CA 95124.

Proakis, J.G. et al., "Digital Signal Processing Principles, Algorithms, and Applications", pp. 520-521, 1996, available from Prentice-Hall, Inc., Upper Saddle River, New Jersey 07458.

Adraka, Ray, "A Survey of CORDIC Algorithms for FPGA Based Computers", Proceeding of the 1998 ACM/SIGDA sixth International Symposium on Field Programmable Gate Arrays, pp. 191-200, Feb. 22-24, 1998, available from Andraka Consulting Group, Inc., 16 Arcadia Drive, North Kingstown, RI 02852.

Janiszewski, Ireneusz, et al., "VHDL-Based Design and Design Methodology for Reusable High Performance Direct Digital Frequency Synthesizers", 38th Design Automation Conference, DAC 2001, p. 573-578, Jun. 18-22, 2001, available from http://sigda.org/Archives/ProceedingArchives /Dac/Dac2001/papers/2001/dac01/pdffiles/35_1.pd.

Veillette, Benoit R., et al., "High Frequency Sinusoidal Genreation Using Delta-Signma Modulcation Techniques", ISCAS 1995, pp. 637-640, vol. 1, Apr. 28-May 3, 1995, available from IEEE, 3 Park Avenue, 17th Floor, New York, NY 10016-5997.

Curticapean, Florean, et al., "Quadrature Direct Digital Frequency Synthesizer Using An Angle Rotation Algorithm" 2003 Int'l Symposium on Circuits and Systems, pp. 81-84, vol. 2, May 25-28, 2003, available from IEEE, 3 Park Avenue, 17th Floor, New York, NY 10016-5997.

Palomaki, K. I., et al. "Methods to Improve the Performance of Quadrature Phas-to-Amplitude Conversion Based on Taylor Series Approximation", 43rd IEEE Midwest Symposium on Circuits and Systems, Aug. 8-11, 2000, pp. 14-17, vol. 1, available from IEEE, 3 Park Avenue, 17th Floor, New York, NY 10016-5997.

Liu, S.-I. et al. "Pipeline Direct Digital Frequency Synthesiser Using Decomposition Method", Devices and Systems, Jun. 2001, pp. 141-144, vol. 148, issue 3, available from IEEE, 3 Park Avenue, 17th Floor, New York, NY 10016-5997.

Curticapean, Florean et al., "A Hardware Efficient Direct Digital Frequency Synthesizer", 8th IEEE Int'l Conference on Electronics, Circuits, and Systems, Sep. 2-5, 2001, pp. 51-54, vol. 1, available from IEEE, 3 Park Avenue, 17th Floor, New York, NY 10016-5997.

Palomaki, Kalle I. et al., "Direct Digital Frequency Synthesizer Architecture Based on Chebysheve Approximation", 34th Asilomar Conference on Signals, Systems and Computers, Oct. 29-Nov. 1, 2000, pp. 1639-1643, vol. 2, available from IEEE, 3 Park Avenue, 17th Floor, New York, NY 10016-5997.

Feher, Bela et al. "Cost Effective 2x2 Inner Product Processors", Field Programmable Logic Application 8th Intl. Workshop, Sep. 3-5, 1998, pp. 348-355, available from Tallinn Technical University, Raja 15, EE0026 Tallinn, Estonia.

* cited by examiner

QUADRATIC APPROXIMATION FOR FAST FOURIER TRANSFORMATION

FIELD OF THE INVENTION

One or more aspects of the invention relate generally to interpolation and, more particularly, to quadratic approximation of sinusoids.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation. One such FPGA is the Xilinx Virtex-II FPGA available from Xilinx, Inc., 2100 Logic Drive, San Jose, Calif. 95124.

Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

FPGAs have more recently been used in digital signal processing applications. Heretofore, implementing Fast Fourier Transform ("FFT") processors in FPGAs has been problematic for large point-size applications. Examples of such applications include demanding communications applications and Synthetic Aperture Radar ("SAR") applications, among other known FFT uses.

More particularly, applications involving high precision, conventionally 20 or more bits, and high resolution, conventionally 16,384 or more samples ("point size"), had significant phase factor memory consumption issues. To alleviate these issues, the phase-factor memories that were completely look-up table ("LUT")-based were replaced by Direct Digital Synthesis ("DDS") blocks. Each DDS contains a sub-sampled LUT, a phase accumulator and some correction circuitry, which combines the phase-factor samples and the phase-accumulator values. Because precision of the phase accumulator scales linearly, an increase in bit precision may be accommodated by increasing the width of the accumulator, namely increasing the width of the look-up table ("LUT"). However, the size of the LUT scales exponentially with each incremental increase in point size, namely the width of the phase, $\phi$. Thus, still large memory usage resulted for a high resolution FFT processor.

Accordingly, it would be desirable and useful to have a high precision and high resolution FFT processor that may be implemented in an FPGA which overcomes one or more of the above mentioned limitations.

SUMMARY OF THE INVENTION

One or more aspects of the invention generally relate to interpolation and, more particularly, to quadratic approximation of sinusoids.

An aspect of the invention is an interpolator configured to provide a quadratic approximation of a sinusoid. A sample source provides first order derivatives of sub-sampled sets of phase factor samples. A differentiator is coupled to receive the first order derivatives and configured to provide second order derivatives of the first order derivatives. A first scaling device is coupled to receive the first order derivatives from the sample source, and a second scaling device is coupled to receive the second order derivatives from the first differentiator. A first integrator is coupled to receive output from the first scaling device and to receive output from the second scaling device. A third scaling device is coupled to receive output from the first integrator. A second integrator is coupled to receive output from the third scaling device.

Another aspect of the invention is a sine and cosine interpolator configured to provide a quadratic approximation. A first interpolator block is configured to provide a cosine function output and a second interpolator block is configured to provide a sine function output. A sample source is coupled to the first interpolator block and the second interpolator block. A flow controller is coupled to the first interpolator block and the second interpolator block. The flow controller is coupled to receive an index input for selecting a harmonic order, and the flow controller is configured to provide signaling responsive in part to the index input. The sample source is coupled to the flow controller and configured to provide phase factor information responsive to the signaling. Each of the first interpolator block and the second interpolator block have: a differentiator coupled to receive output from the sample source to provide a derivative of the phase factor information; a first scaling device coupled to receive the phase factor information; a second scaling device coupled to receive the derivative; a first integrator coupled to receive output from the first scaling device and to receive output from the second scaling device; a third scaling device coupled to receive output from the first integrator; and a second integrator coupled to receive output from the third scaling device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1A:
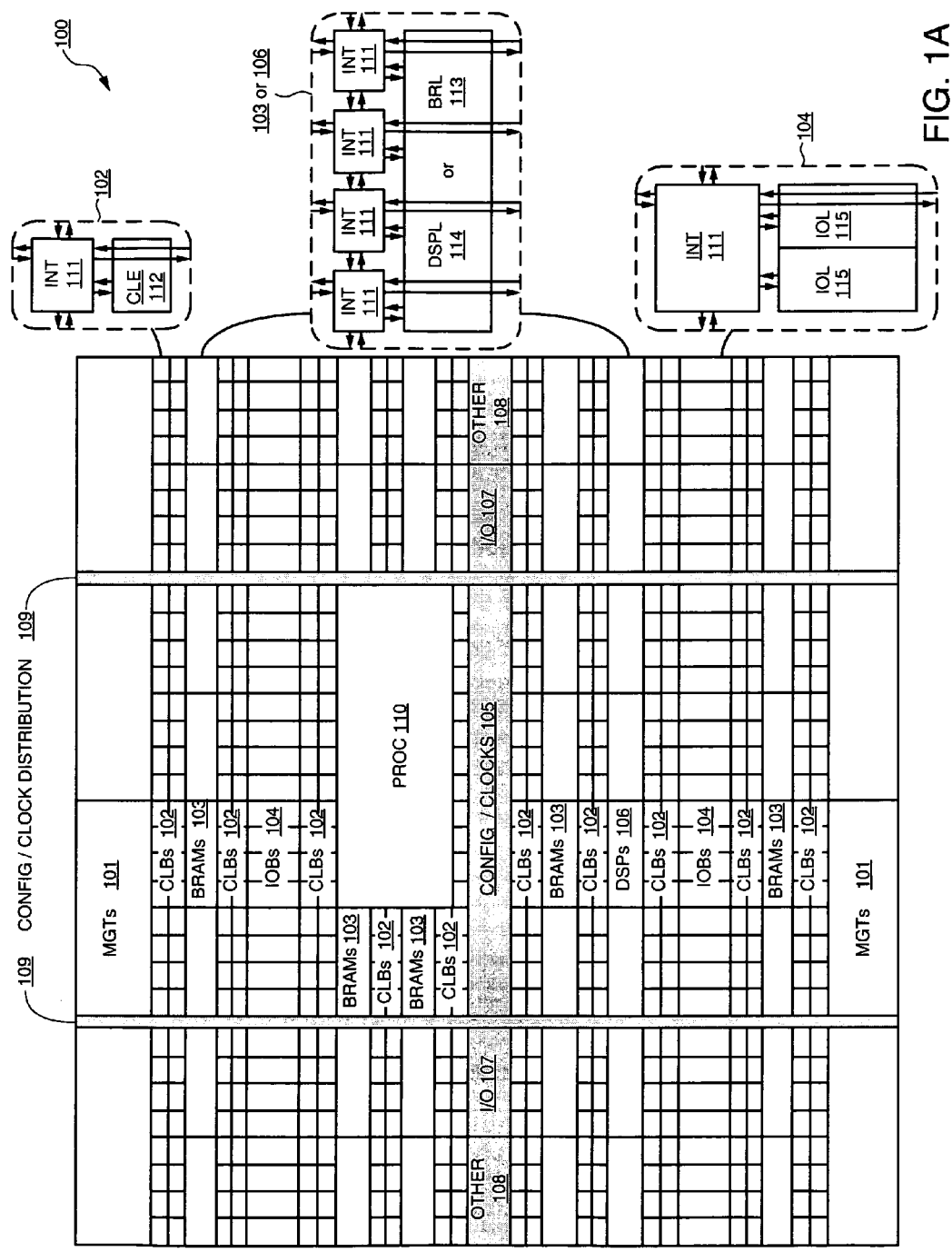
FIG. 1A is a simplified block diagram depicting an exemplary embodiment of a columnar Field Programmable Gate Array ("FPGA") architecture in which one or more aspects of the invention may be implemented.

FIG. 1A illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include one or more dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1A.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1A) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1A include additional logic blocks that disrupt the regular columnar structure making up a large part of the FPGA. The additional logic blocks can be programmable blocks and/or dedicated logic. For example, the processor block 110 shown in FIG. 1A spans several columns of CLBs and BRAMs.

Note that FIG. 1A is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1A are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4 FPGA from Xilinx, Inc. of San Jose, Calif.

Figure 1B:
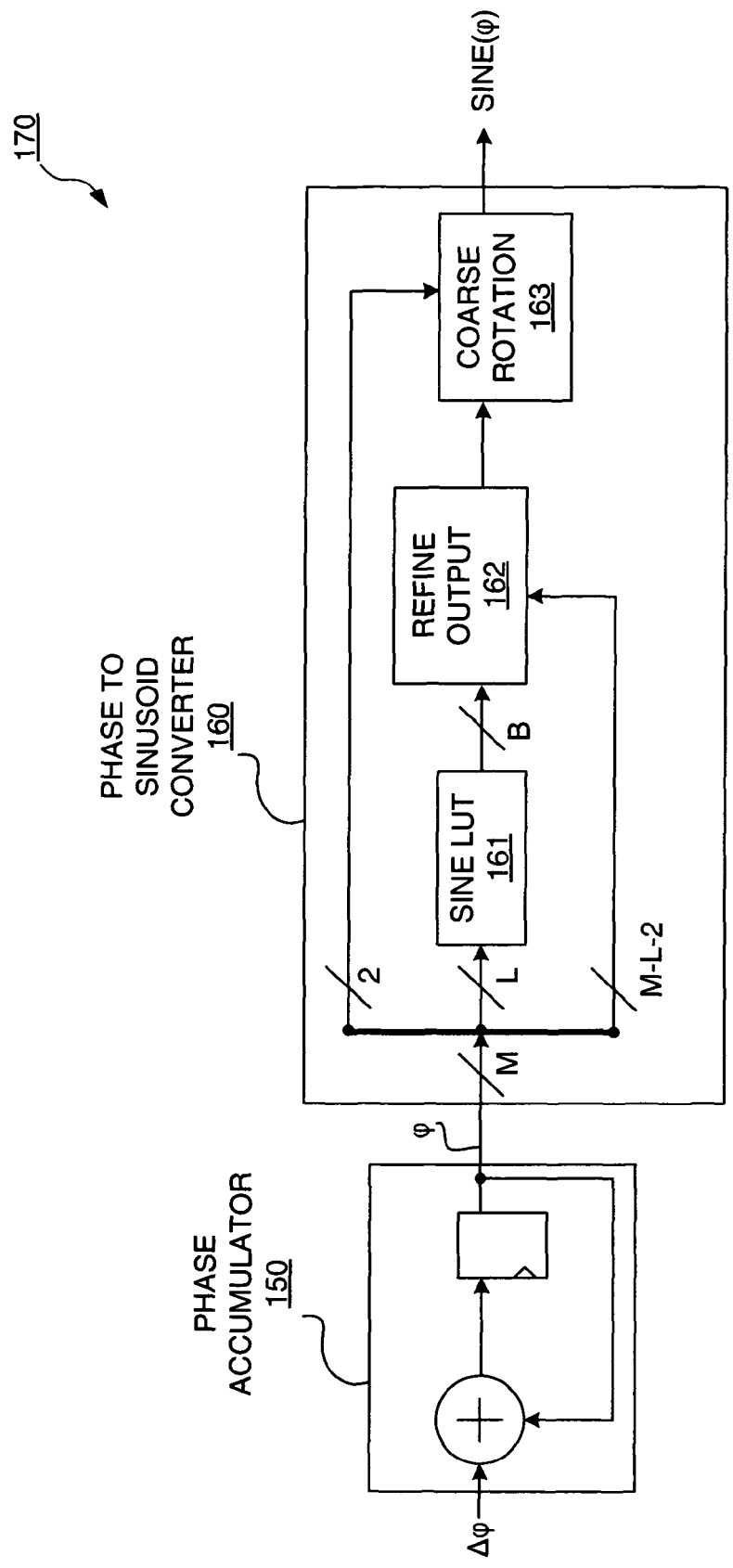
FIG. 1B is a block diagram of a Direct Digital Synthesis ("DDS") from the prior art.

FIG. 1B is a block diagram of a Direct Digital Synthesis ("DDS") 170 from the prior art. DDS 170 uses a phase accumulator 150, the output of which is coupled to a phase-to-sinusoid converter 160. A phase increment ($\Delta\phi$), or frequency control word, is input to phase accumulator 150, and output of phase accumulator is accumulated phase, $\phi$, of bit width M.

The less significant bits, L, of accumulated phase, $\phi$, may be input to sine look-up table ("LUT") 161 for phase-to-amplitude conversion for output of a phase factor of bit width B. Sine LUT 161 may store pre-calculated phase factors, namely samples of a complex sinusoid. Note that as used herein, a look-up table (or LUT) generally may refer to any memory or storage that stores a table of values, and, in particular, is not limited to LUTs often found in FPGAs.

A phase factor output from sine LUT 161 may be refined by refine output block 162 responsive to M-L-2 bits of accumulated phase, $\phi$, provided to refine output block 162. Refine output block 162 may be an implementation of a linear interpolation. Output of refine output block 162 may be provided to a coarse rotation block for rotation responsive to the 2-bit width input obtained from accumulated phase, ϕ, of bit width M, as is known, to produce sinusoid, sine(ϕ).

For a DDS application, phase accumulator quantization error of a DDS block may be handled by widening the accumulator of the DDS block. Basically, a DDS block uses a clock signal (not shown in FIG. 1B) and a phase increment (Δϕ), namely a "frequency control word" input, and generates samples of a sinusoid with a frequency:

$$f = f_{ref} \frac{\Delta \varphi}{2^M} \quad (1)$$

where M is the bit width of the phase accumulator, as previously described, and $f_{ref}$ is the reference frequency, namely the frequency of the input clock signal. Thus, a sinusoid may be digitally generated.

Figure 2:
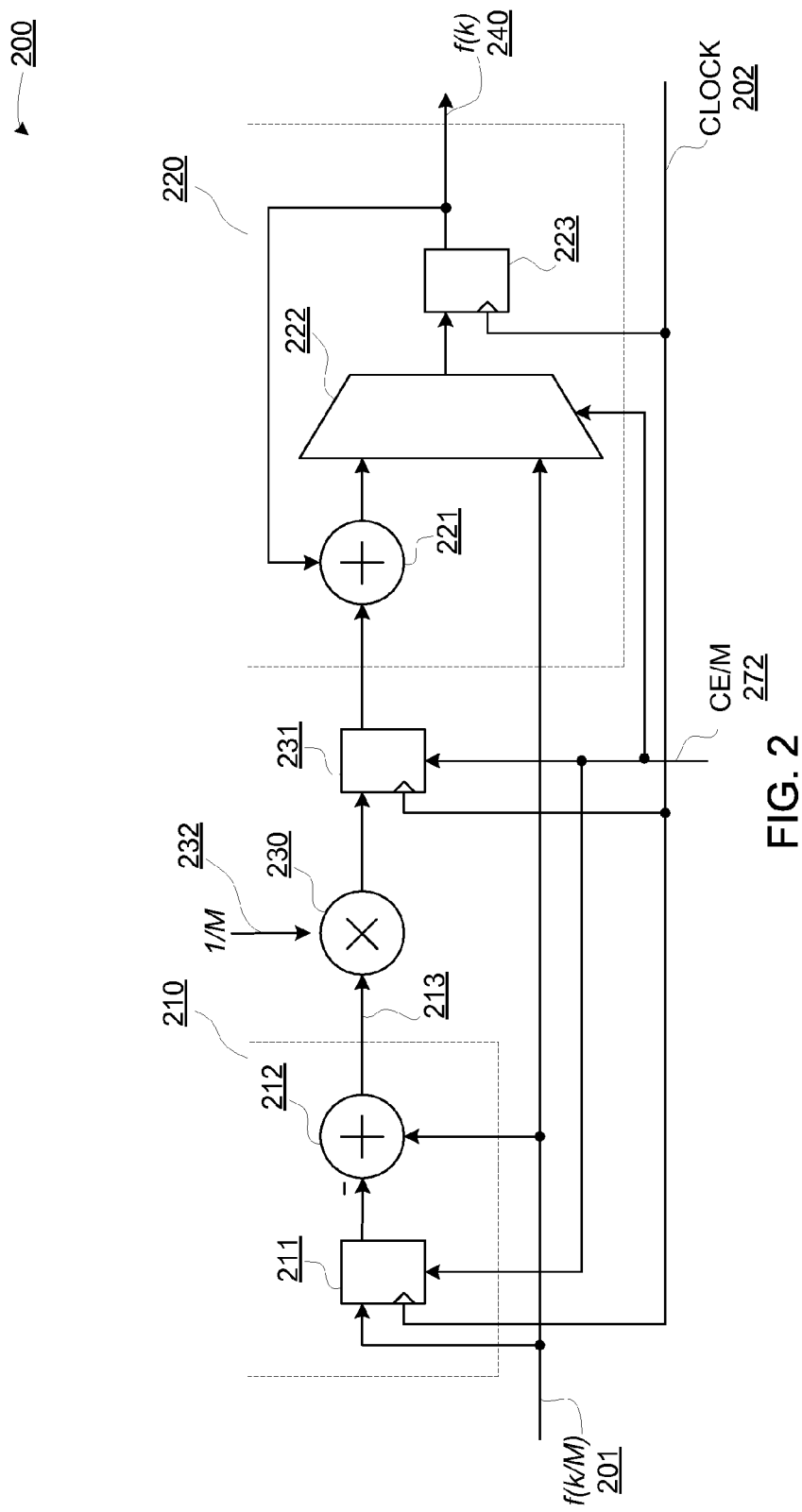
FIG. 2 is a schematic/block diagram depicting an exemplary embodiment of a differentiator-integrator circuit.

FIG. 2 is a schematic/block diagram depicting an exemplary embodiment of a differentiator-integrator circuit 200. Differentiator-integrator circuit 200 includes differentiator 210 and integrator 220. Differentiator 210 includes flip-flop 211 and adder or subtractor 212. Integrator includes adder 221, multiplexer 222, and flip-flop 223.

A discrete time function, f(n), may be interpolated by the equation:

$$f(k) = \frac{f(n_{i+1}) - f(n_i)}{n_{i+1} - n_i}(k - n_i) + f(n_i) = a_i(k - n_i) + b_i \quad (2)$$

Successive samples from $n_i$ to $n_{i+1}$ may be obtained by preloading integrator 220 with $b_i$ and then accumulating $a_i$ over $n_{i+1}-n_i$ clock cycles of an input clock signal 202. The domain of n of the above-mentioned discrete time function, f(n), may be sliced into M uniform sections such that S is equal to $n_{i+1}-n_i$, where $$\frac{1}{n_{i+1} - n} = \frac{1}{S} \quad (3)$$

are constants. Accordingly, input 201 is a discrete function based on a/M samples, namely, f(k/M).

Input signal 201 is provided as a data input to flip-flop 211 and to adder ("subtractor") 212 of differentiator 210 and as a data input to multiplexer 222 of integrator 220. Flip-flops 211, 223, and 231 are clocked responsive to clock signal 202. As previously mentioned, clock signal 202 may be for providing an input reference frequency. Output of flip-flop 211 is provided as an input to subtractor 212 for subtraction from input 201 to provide an output 213. Output 213 is provided as an input to multiplier 230. A 1/M constant input 232 is provided as another input to multiplier 230 and the output of multiplier 230 is provided as a data input to flip-flop 231. Output of flip-flop 231 is provided as an input to adder 221. The output of adder 221 is provided as an input to multiplexer 222. Output of multiplexer 222 is provided as a data input to flip-flop 223. Output from multiplexer 222 may be controllably selected responsive to clock enable (CE/M) signal 272, which may be provided as a control signal input to multiplexer 222. Output signal 240 of flip-flop 223 is the function f(k), which may be used for interpolating the discrete time function f(n). Output of flip-flop 223 is fed back as an input to adder 221. Notably, flip-flops 211 and 231 are not cycled as often as flip-flop 223. More particularly, clock enable (CE/M) signal 272 is asserted 1/Mth the amount that a CE signal is asserted for flip-flop 223. Flip-flop 223 may have a clock enable held active, and flip-flops 211 and 231 may be active for clocking on one out of every M clock cycles of clock signal 202 responsive to clock enable signal 272. Notably, rather than having clock signal 202 fed into a divide-by-M divider for providing a clock signal to flip-flops 211 and 231, clock enable signal 272 may be used.

It should be appreciated that output samples of output signal 240 may be accessed in a continuous manner. If the sample rate conversion between input signal 201 and output signal 240 is $$S = \frac{N}{M} = 2^{B_r}$$

where $B_r$ is the $\log_2(N/M)$, then the multiplication for constant $a_i=1/S(f(n_{i+1})-f(n_i))$ may be replaced with bit shifting to generate the complex valued phase factor series $W_N^n$. Two target functions are $$f_s(n) = \sin\left(\frac{2\pi n}{N}\right), \quad \text{and} \quad (4)$$

$$f_c(n) = \cos\left(\frac{2\pi n}{N}\right) \quad (5)$$

As both sine and cosine functions, $f_s(n)$ and $f_c(n)$ respectively, are periodic with a period length of N, integrator 220 may be initialized once with $f_0$ for either $f_s(n)$ or $f_c(n)$, and integrator preload logic may be removed as all bits may be retained through scaling and integration. Alternatively, if all integrator bits cannot be retained, the integrator can be preloaded with the exact sample being read from the LUT using preload logic, namely multiplexer 222, which may be used to mitigate noise accumulation. Thus, resource usage and operating speed may be balanced by simulating interpolator noise accumulation with or without preload logic. Use of preload logic offers a trade-off between use of a multiplexer and cost reduction and speed improvement due to reduced accumulator width.

Figure 3:
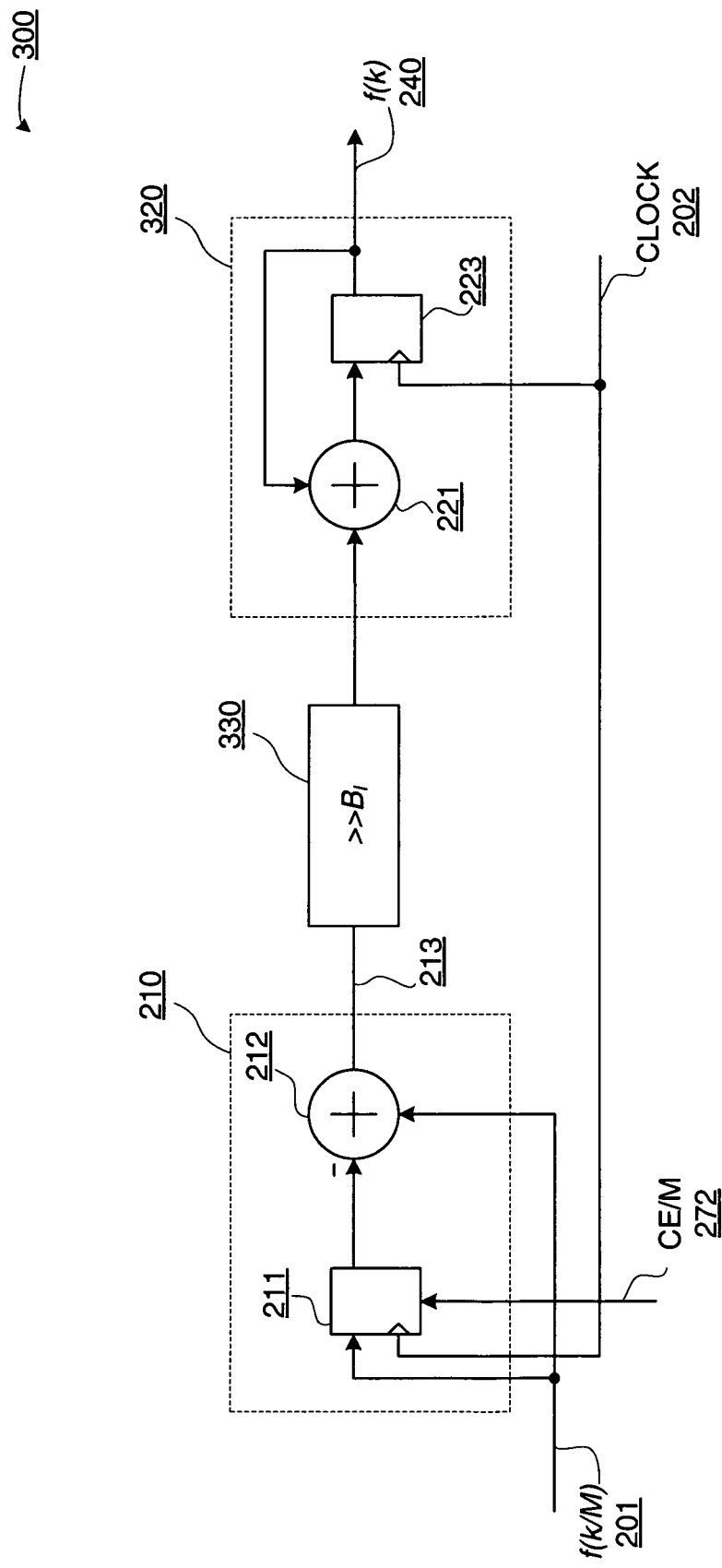
FIG. 3 is a schematic/block diagram depicting an exemplary embodiment of the differentiator-integrator circuit of FIG. 2 with a bit shifter replacing the flip-flop and multiplier of the differentiator-integrator circuit of FIG. 2.

FIG. 3 is a schematic/block diagram depicting an exemplary embodiment of a differentiator-integrator circuit 300 where a bit shifter 330 replaces flip-flop 231 and multiplier 230 of differentiator-integrator circuit 200 of FIG. 2. Accordingly, differentiator 210 is the same as previously described with reference to FIG. 2. However, integrator 320, which replaces integrator 220 of FIG. 2, is the same as integrator 220 of FIG. 2 except that multiplexer 222 is removed.

Output 213 of differentiator 210 is provided as an input to bit shifter 330 for scaling. It should be appreciated that the dynamic range of a derivative of a sine or cosine function differs from the dynamic range of the original sinusoid. The differentiated signal is proportional to the original signal, but it is scaled by a constant dependent on the frequency. Thus, bit shifting may be used to avoid overflows for integrators, and better utilize available word-length for differentiators. In this example, the scaling after the differentiator is implemented by bit shifting $B_r$ bits to the left (or shifting only $B_r-B_l$ bits to the right), where $B_j$=ceil($\log_2(6.28/M)$) for "ceil" meaning rounding up. Output of bit shifter 330 is provided as an input to adder 221 of integrator 320. Output of adder 221 is provided as a data input to flip-flop 223. Output of flip-flop 223 is provided as output signal 240 and is provided as a feedback input to adder 221.

Figure 4A:
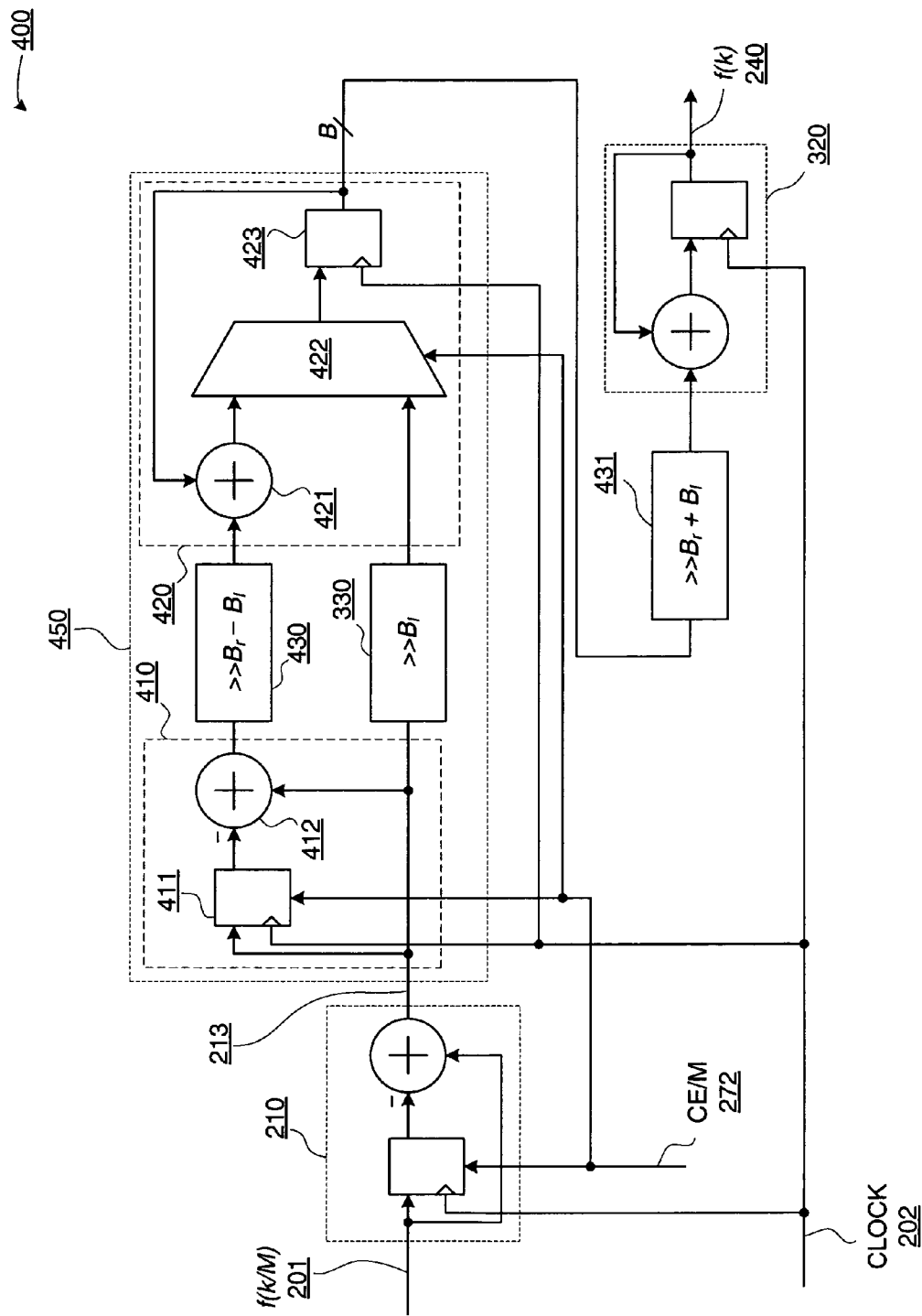
FIG. 4A is a schematic/block diagram depicting an exemplary embodiment of a differentiator-integrator circuit having additional differentiation and integration stages in comparison to the differentiator-integrator circuit of FIG. 3.

FIG. 4A is a schematic/block diagram depicting an exemplary embodiment of a differentiator-integrator circuit 400 having additional differentiation and integration stages in comparison to differentiator-integrator circuit 300 of FIG. 3. As previously described, an input signal 201 is provided to a differentiator 210. Notably, input signal 201 may be a seed sample obtained from a table of phase factor samples, and differentiator-integrator circuit 400 is to refine such sample iteratively to produce intervening samples between input signal 201 samples in a table thereof. Accordingly, a LUT (not shown in FIG. 4) may be used to store seed samples for f(WM). In this configuration, the size of the LUT may be reduced as only a limited or compressed set of data samples are used.

Output of differentiator 210 is provided to quadratic differentiator-integrator circuitry 450. The output of differentiator-integrator circuitry 450 is provided to a bit shifter 431, and the output of bit shifter 431 is provided to integrator 320 for providing output 240. Accordingly, the addition of differentiator-integrator circuitry 450 makes output 240 a quadratic approximation. It may be appreciated that differentiator-integrator circuitry 450 deploys differentiation and integration as previously described in order to interpolate a first order derivative of f'(n). Notably, if the derivative of f'(n) which is subsequently integrated by integrator 320 is not a constant but rather is a linear function, a second order interpolation may be done, namely by differentiator-integrator circuitry 450.

Output 213 of differentiator 210 is provided to a differentiator 410 of differentiator-integrator circuitry 450. More particularly, output 213 of differentiator 210 is provided to a data input of flip-flop 411 and to a data input of an adder ("subtractor") 412, each of differentiator 410. Flip-flop 411 may be clocked responsive to clock signal 202 and clock enable signal 272. Within differentiator 410, output of flip-flop 411 is provided to subtractor 412 for subtraction from output of differentiator 210.

Output of differentiator 210 is further provided to bit shifter 330 of differentiator-integrator circuitry 450. Output of bit shifter 330 is provided to a data input of multiplexer 422 of integrator 420.

Output of subtractor 412 is provided to bit shifter 430 of differentiator-integrator circuitry 450. Bit shifter 430 is for $B_r$–$B_l$ bit shifting, where $B_r$ is the number of bits to shift to the right, which was introduced when the multiplier 230 was replaced by shifter 330. Output of bit shifter 430 is provided to adder 421 of integrator 420 of differentiator-integrator circuitry 450.

Output of adder 421 is provided to a data input port of multiplexer 422. Clock enable signal 272 may be provided as a control signal input to multiplexer 422 for selecting between data inputs for output therefrom. Output of multiplexer 422 is provided as a data input to flip-flop 423. Flip-flop 423 of integrator 420 may be clocked responsive to clock signal 202. Output of flip-flop 423 is provided as a feedback signal input to adder 421. Notably, a bit precision of B bits is output from differentiator-integrator circuitry 450. Output of differentiator-integrator circuitry 450 is provided as an input to bit shifter 431, which shifts B bits such that they are substantially less than $B_r$+$B_l$. Output of bit shifter 431 is provided to integrator 320, described above with respect to FIG. 3 and which description is not repeated here for purposes of clarity. An output of integrator 320 provides output 240.

Thus, a second order interpolation, namely interpolation of f'(n), is done within a first order interpolation, namely interpolation of f(n), to provide a quadratic approximation. Notably, quadratic approximation may substantially reduce noise compared to linear approximation. Thus, interpolating through longer sections, namely greater distances between samples in a LUT, while maintaining an upper bound on interpolation noise, is facilitated. Such greater distances provide for greater data compression for purposes of storing samples in a LUT, as only S=N/M samples may be pre-calculated and stored in a LUT. Alternatively, because so few samples are used, such samples may be calculated in real time for use. Moreover, as it is possible to pre-calculate and store discrete differentials, namely a first order derivative of the function f(n), differentiator 210 may be removed and replaced with a table of stored, pre-calculated discrete differential results for samples for f(k/M).

It should be noted again that dynamic range of a first order derivative of a sinusoid is less than the dynamic range of stored sinusoid samples, because $$\frac{d}{dx}[A \sin(\omega x + \varphi_0)] = A \omega \cos(\omega x + \varphi_0) \quad (6)$$

where $$\omega = \frac{2\pi}{M}$$

is much less than 1. Dynamic range is compressed by $$B_l = -\left[\log_2\left(\frac{2\pi}{M}\right)\right] \quad (7)$$

bits as data passes through differentiators 210 and 410 and is expanded by $B_l$ bits as it passes through integrators 420 and 320. Notably, data is shifted to the right only by $B_r$–$B_l$ bits by bit shifter 430 for implementing multiplication by a constant while enhancing available dynamic range. However, after integration by integrator 420, such data is scaled back by bit shifter 431 by $B_r$+$B_l$ bits to avoid arithmetic overflows, as well as to ensure correctly scaled output values.

Figure 4B:
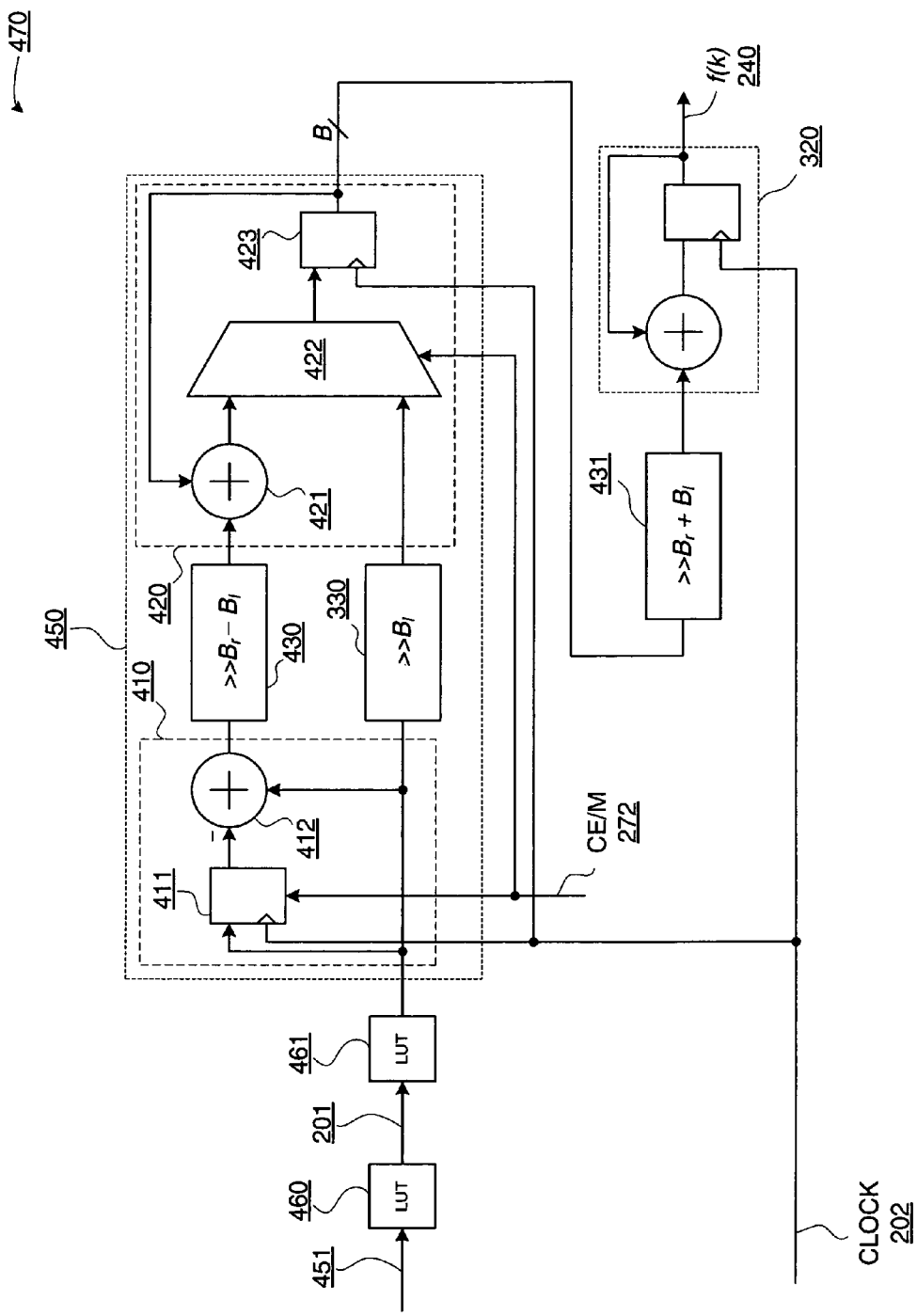
FIG. 4B is a block/schematic diagram depicting an exemplary embodiment of the differentiator-integrator circuit of FIG. 4A except that a differentiator has been replaced with a look-up table ("LUT").

FIG. 4B is a block/schematic diagram depicting an exemplary embodiment of a differentiator-integrator circuit 470. Differentiator-integrator circuit 470 is the same as differentiator-integrator circuit 400 of FIG. 4A except that differentiator 210 has been replaced with LUT 461. Additionally, for purposes of clarity, LUT 460 is illustratively shown. Thus, for example, an initial value for f(k/M) may be obtained from LUT 460 responsive to input signal 451. Output of LUT 460, namely input signal 201, may be provided to LUT 461. LUT 461 includes pre-calculated/stored values of first order differentials for input signal 201, namely first order differentials of f(k/M) phase factor samples stored in LUT 460. Output of LUT 461 is provided as an input to flip-flop 411 and subtractor 412 of differentiator 410 and as an input to bit shifter 330, all of differentiator-integrator circuitry 450.

It should be understood that the differentiator-integrator circuits of FIGS. 4A and 4B may be used to produce either a cosine function or a sine function. However, it should be appreciated that use of two of such circuits may be useful to produce both a sine and a cosine function where phase factor samples are pre-calculated and stored for sharing for both cosine and sine generation.

Figure 5:
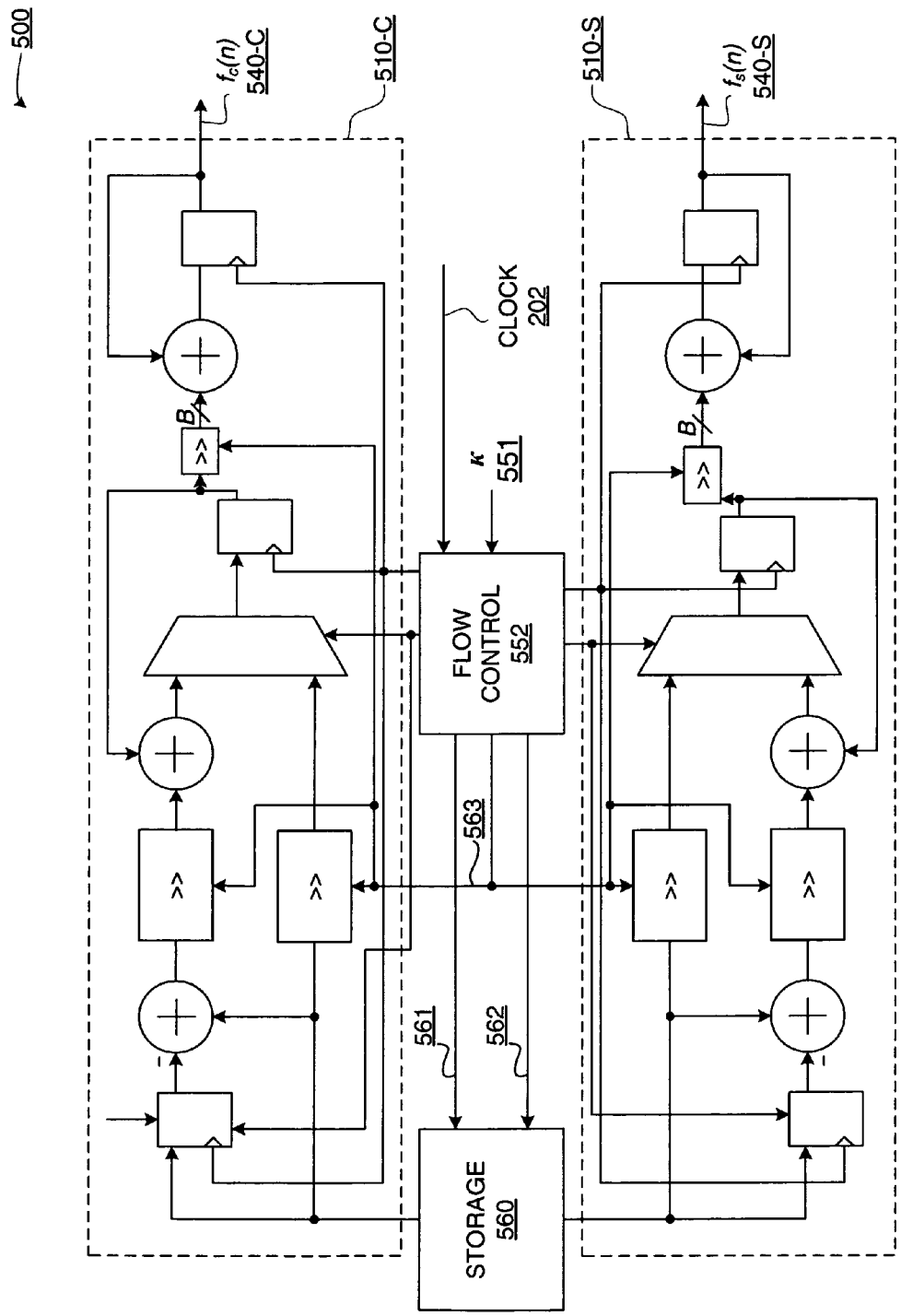
FIG. 5 is a block/schematic diagram depicting an exemplary embodiment of a differentiator-integrator circuit for producing a cosine output signal and a sine output signal.

FIG. 5 is a block/schematic diagram depicting an exemplary embodiment of a differentiator-integrator circuit 500 for producing a cosine output signal 540-C and a sine output signal 540-S, namely $f_c(n)$ and $f_s(n)$ functions responsive to variable n respectively. Differentiator-integrator circuit 500 may include two differentiator-integrator circuit blocks, such as a cosine differentiator-integrator block 510-C and a sine differentiator-integrator block 510-S, sharing a common LUT of phase factor samples, such as storage 560, and sharing a common flow controller, such as flow control 552. As shall be more clearly understood from the following description, differentiator-integrator circuit 500 is an interpolator system configured for quadratic approximation for sinusoids. In a particular example, phase factors are approximated for high resolution, high precision FFTs. Differentiator-integrator circuit 500 has two interpolators, namely cosine differentiator-integrator block 510-C and a sine differentiator-integrator block 510-S, which may be implemented as described with reference to FIGS. 4A and 4B. However, for purposes of clarity by way of example and not limitation, differentiator-integrator circuit 400 of FIG. 4A is used in this example of FIG. 5.

An input signal 551, k, which is the frequency control word, is provided as input to flow control 552. Thus, for example, to generate $W_N^{nk}$ for all $k=2^k$, where $0<k\leq \log_2 N$, phase factors may be pre-calculated and thus first order derivatives of such phase factors, may be stored in storage 560. For an implementation, storage 560 may be a dual-ported block RAM.

The number of samples stored in storage 560, and thus the number of interpolation periods, may thus be limited by the size of the block RAM used for storage 560. For example, for reasonably low quantization noise, a 36-bit wide block RAM capable of storing 512 words may be used. However, it should be appreciated that other bit widths, as well as other word storage sizes, may be used. Furthermore, more efficient addressing may be implemented by using half-wave symmetry of a sinusoidal wave to effectively double the number of stored sinusoid samples. In the above described embodiment, M may thus equal 1024 words per block RAM.

To enhance results, integrator contents may be initialized. Assuming the expected wave form is of a form $$f(n) = A \sin\left(\frac{2\pi n}{N} + \varphi_0\right) \quad (8)$$

to ensure that the first two output values are f(0) and f(1), initial contents of the output integrator, namely integrator 320 of FIGS. 4A and 4B, may be set as $$f(0) = A \sin(\varphi_0) + \epsilon_0 \quad (9)$$

and the initial contents of the input integrator, namely integrator 420 of FIGS. 4A and 4B may be set as $$f(1) - f(0) = A\left[\sin\left(\varphi_0 + \frac{2\pi}{N}\right) - \sin(\varphi_0)\right] 2^{B_l+B_r} + \epsilon_1 \quad (10)$$

where $\epsilon$ or $\epsilon(n)$ error values provide extra freedom to fine tune output in order to reduce noise.

Contents of a LUT implemented in storage 560 may be a sinusoid with amplitude of the form $$A\frac{2\pi}{M}(1+\varepsilon_A) \quad (11)$$

and initial phase of the form $$\frac{2\pi}{M} + \frac{\pi}{2} + \varepsilon_\varphi. \quad (12)$$

Opposing $\epsilon_0$ and $\epsilon_1$, which may be used to suppress DC bias, have relatively small effect on the output noise spectrum. In contrast, changes as small as $10^{-6}$ in amplitude and phase correction factors $\epsilon_A$ and $\epsilon_\varphi$, respectively, may influence output noise as much as 40 decibels.

It should be appreciated that the absolute values of a piece-wise linear first order derivative are bounded by the expected derivative. Errors of the derivative thus are accumulated by the second integration stage. If the error of a derivative has the same sign over a half-sine period, which may potentially be a significant number of samples, the integrated output may be skewed. Increasing the amplitude of the derivative by $(1+\epsilon_A)$ allows the piece-wise linear first order derivative to extend over an expected bounding curve, which in turn reduces accumulated noise due to the reversal of the sign of the error.

The task may be broken down into distinct steps; in other words, determining values $\epsilon_A$, $\epsilon_\varphi$, $\epsilon_0$ and $\epsilon_1$ can be separated out. First, optimal values for $\epsilon_A$ and $\epsilon_\varphi$ are found by simulation, then $\epsilon_1$ is set such that the derivative transitions smoothly after a first multiplexer load is input into the first integration stage. The first multiplexer output error of a first integration stage $\epsilon_0$ may be obtained such that it cancels out the mean error. The two-dimensional optimization problem for $\epsilon_A$ and $\epsilon_\varphi$ may be solved iteratively one variable at a time using the Newton-Raphson method. Solving for different values of N, such as 2048, 4096, and 8192, suggests that $\epsilon_\varphi$ may be approximated by the linear function $$\varepsilon_\varphi(N) = \frac{\pi}{N}. \quad (13)$$

and $\epsilon_A$ by a hyperbolic function $$\varepsilon_A(N) = c_0 - \frac{c_1}{x-c_2}, \quad \text{where} \quad (14)$$

Figure 6:
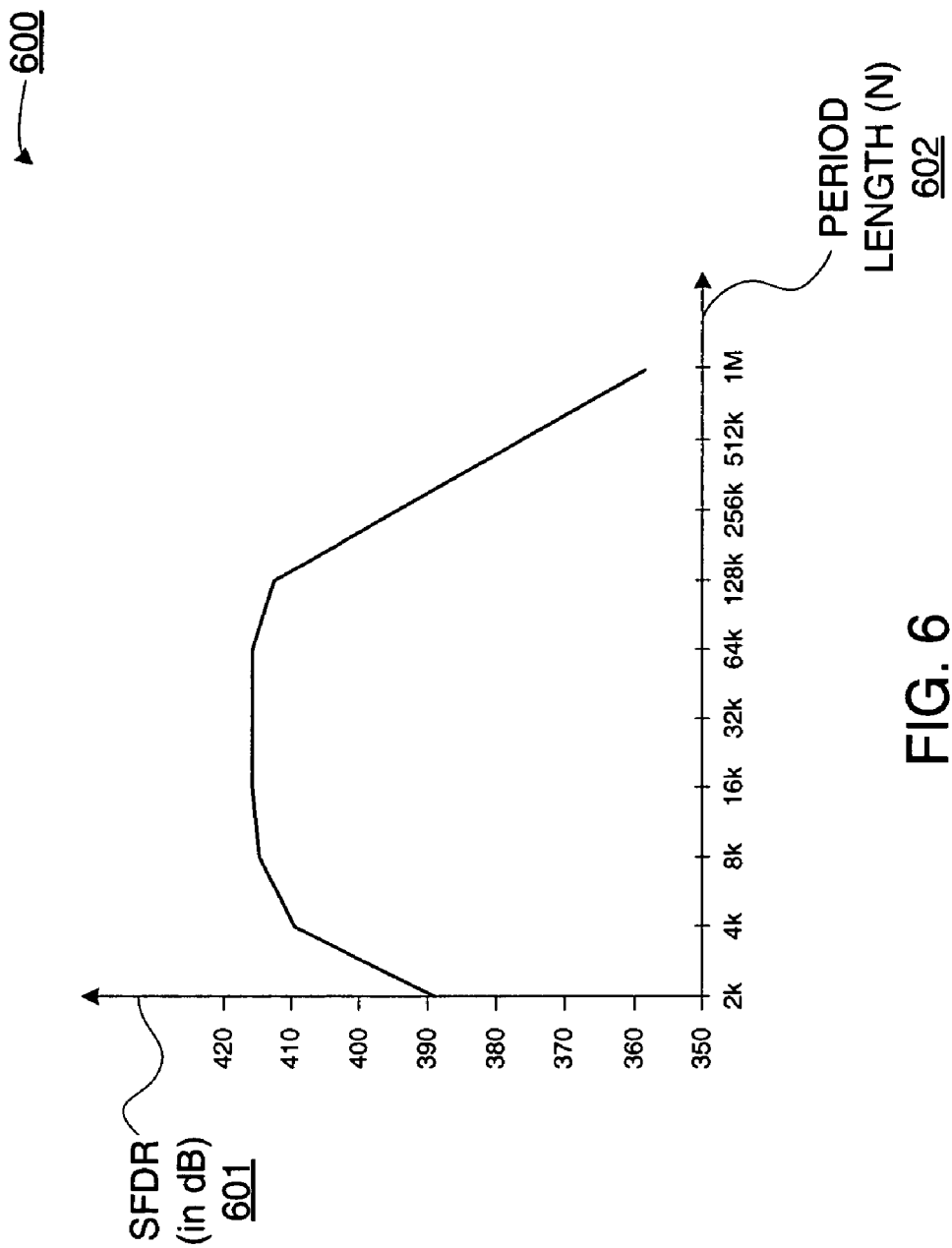
FIG. 6 is a graph depicting the relationship between Spurious Free Dynamic Range ("SFDR") and period length for a single block RAM used to implement a LUT for an FPGA implementation.
Figure 7:
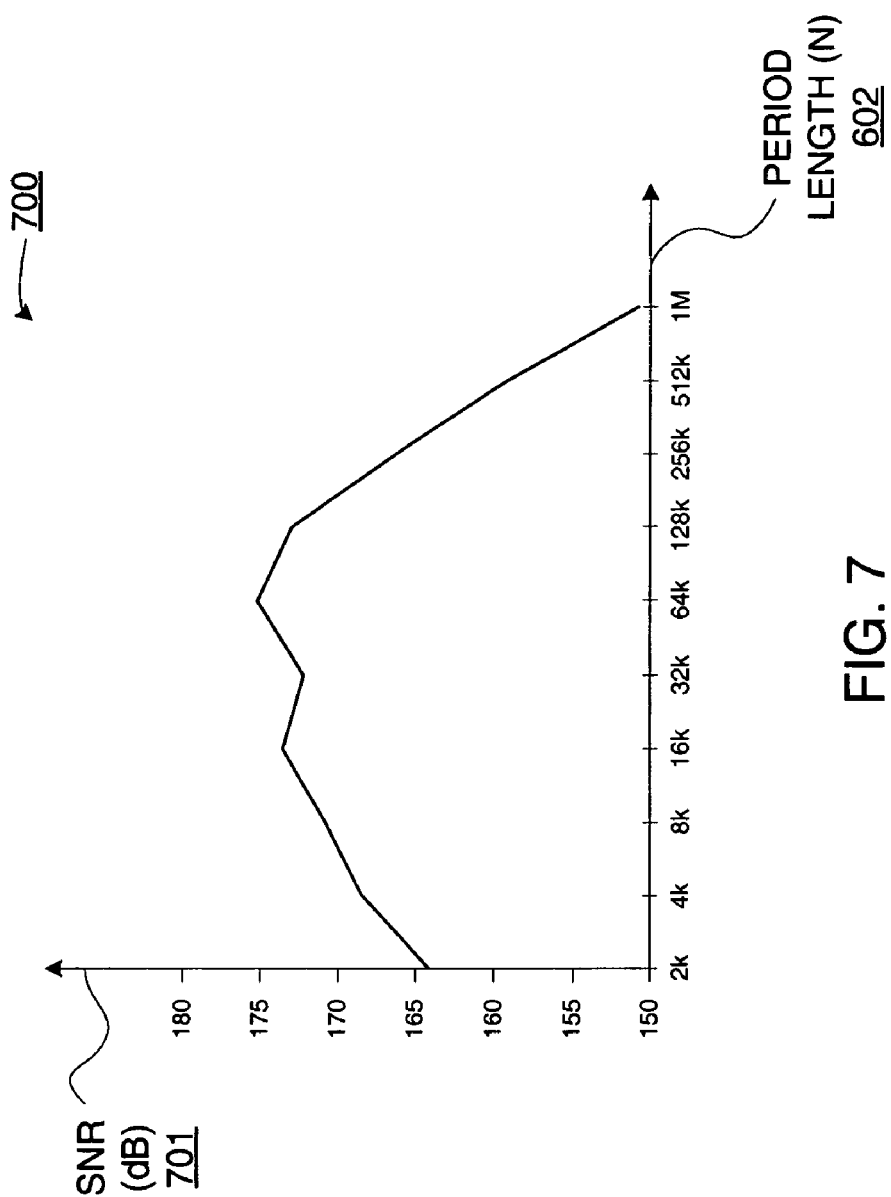
FIG. 7 is a graph depicting the relationship between Signal to Noise Ratio ("SNR") and period length for a single block RAM used to implement a LUT for an FPGA implementation.

$c_0 = 3.1892673178\ e-006$ $c_1 = 0.0010971156, \text{ and}$ $c_2 = 1180.2123120.$ Using these values, Spurious Free Dynamic Range ("SFDR") as well as Signal to Noise Ratio ("SNR") values as a function of N (the period length) values and may be obtained as respectively indicated in FIGS. 6 and 7. In the example of FIGS. 6 and 7, B is set equal to 36 and M is set equal to 1024. In an embodiment in a Virtex-II FPGA from Xilinx, Inc. of San Jose, Calif., a single block RAM is used as a LUT for these examples.

Flow control 552 may be used to control clock signals provided to a cosine differentiator-integrator block 510-C as well as sine differentiator-integrator block 510-S. Again, blocks 510-C and 510-S may be respective instances of differentiator-integrator circuit 400 of FIG. 4A as illustratively shown. Again, it has been assumed that phase factor generation for DDS in this example is to generate $W_N^{nk}$ for all $k=2^k$. Again, it should be understood that k is the frequency control word.

Flow control 552 may include a counter for counting clock cycles. For example, suppose k is set equal to 1 for a first harmonic of a sinusoid. Flow control 552 in response to k being set to 1 may output read addresses 561 and 562. Read address 561 may be for obtaining an initial sample for a first order harmonic of a cosine responsive to k, and read signal 562 may be for obtaining an initial sample for a first order harmonic for a sine wave responsive to k being equal to 1. Thus, read addresses 561 and 562 may be used to obtain first order derivatives of seed phase factor samples from storage 560 for an order of sine or cosine harmonic selected responsive to k. Additionally, flow control 552 may be used to set initial values via control signal 563 to bit shifters, such as bit shifters 330, 430 and 431 of FIG. 4A, of differentiator-integrator block 510-C and of differentiator-integrator block 510-S, as well as counting of clock cycles to provide CE signal 272 of FIG. 4A.

After k is set, differentiator-integrator blocks 510-C and 510-S then are cycled for some number of cycles generating sample points respective to angular positions of a sine or cosine wave. It should be appreciated that n is varied more frequently than k.

For a second harmonic, k may be set equal to 2; for a fourth order harmonic, k may be set equal to 4. Accordingly, read addresses 561 and 562 responsive to the setting of k will obtain an associated initial sample for cosine and sine, respectively, for the targeted harmonic. Subsequent samples are obtained after N iterations. Accordingly, it should be understood that for "in-place FFTs," storage 560 contains all first order derivatives for phase factor sample sets for each harmonic order supported. Hereinafter, phase factor samples and first order derivatives therefore may generally be referred to as samples. Notably, these samples are sub-sampled, meaning that there is some separation between such samples such that interpolation between samples is to be used to provide an accurate approximation. Thus, flow control 552 counts a number of clock cycles until N interim points have been generated, before a next sample for cosine or sine is obtained. Thus, depending on the number of harmonics, the number of sets of samples for quadratic approximation over N clock cycles between samples may vary. The precision of the location of each of those starting points may be determined by the bit width of data that storage 560 is capable of handling. Although precision for samples may be responsive at least in part to data bit width of storage 560, it should be appreciated that differentiator-integrator blocks 510-C and 510-S use a quadratic, or parabolic, approximation, which is more accurate for approximating a sinusoidal curve between samples than linear interpolation or approximation.

For example, assuming that there are 32,768 points for a sinusoidal wave, and assuming that 128 iterations may be done between stored points of the sinusoidal wave, storage 560 may have approximately 32,768 divided by 128, namely 256, points for each sinusoidal wave harmonic. Thus, flow control 552 may be configured to issue new addresses and new preload values responsive to a change in k. Additionally, flow control 552 may be configured to count N iterations between samples, for example for 128 clock cycles, for issuing one or more new addresses to sequentially obtain each one or more next samples for approximating a sinusoidal wave.

Moreover, flow control 552 may be configured to count each sample obtained from storage 560 to know when a last sample point has been obtained for a sinusoidal wave harmonic being approximated. Again, flow control 552 may be implemented with counters for counting N iterations; furthermore, flow control 552 may receive clock signal 202 for counting clock cycles thereof. Although specific numeric examples have been used for purposes of clarity by way of example, it should be appreciated that other numerical examples may be used depending on precision and resolution to be obtained. However, it should be appreciated that a precision of at least 160 dB over a resolution of at least 16 k samples may be obtained.

Continuing the above example, assuming differentiator-integrator circuit 500 has been initialized, this means that preload values associated with k are registered in registers of integrators of differentiator-integrator blocks 510-C and 510-S. These preload values may be either a starting sample point or an end sample point for an iteration sequence to transpire. As noted above, such sample points may be obtained from storage 560 for preloading.

After all intermediate points for a sequence of iterations have been generated, flow control 552 may read from storage 560 again to obtain a next sample point from which to start approximating. This next sample point in the sequence of sample points for a sinusoidal wave may also be preloaded into registers of integrators of differentiator-integrator blocks 510-C and 510-S. Thus, for 256 reads from storage 560 with 128 iterations between reads, a wave having 32,768, namely "32 k," intermediate points between sample points may be generated. Accordingly, this may be used for an FFT of a cosine or an FFT of a sine.

FIGS. 6 and 7 are graphs depicting the relationship between SFDR 601 and period length 602 and SNR 701 and period length 602, respectively, for a single block RAM used to implement a LUT for a simulated FPGA implementation. In FIG. 6, SFDR profile 600 is shown as a function of N, and in FIG. 7, SNR profile 700 is shown as a function of N, while B and M are held constant. In these two examples, B is set equal to 36 and M is set equal to 1024. Notably, point sizes less than 2048 may be generated by bypassing the integrators. Thus, with renewed reference to FIG. 5, when flow control 552 selects no bit shifting and continuous loading of the respective input integrators of differentiator-integrator blocks 510-C and 510-S, setting an interpolation length equal to 1 means LUT contents are effectively fed directly through the preload logic of the integrators to provide outputs 540-C and 540-S, respectively. Accordingly, it should be appreciated that differentiator-integrator blocks 510-C and 510-S may be referred to as interpolators 510-C and 510-S, respectively. Moreover, differentiator-integrator circuit 500 may be referred to as interpolator system 500.

For pipelined FFTs, where each rank or processing element has its own phase-factor source for phase factors associated with the harmonic to be generated by such processing element, storage 560 may be replaced by a resonator. This is because the phase factor source for a processing element having to deal with only one harmonic need only provide one phase factor sample series or set. Conventionally, a resonator structure may be implemented with at least one multiplier. However, for an FPGA implementation, use of a multiplier may have approximately the same cost in terms of resources as a block RAM. However, for continuous quadratic interpolation, one new input sample is used only for every S output samples. Thus, by choosing S sufficiently large, the sparse input series may be generated using a resonator with a bit-serial multiplier. Accordingly, to generate $W_N^n$ for $N>2^{14}$, the LUT, namely block RAM, in interpolator system 500 of FIG.

5 may be replaced by a pipelined resonator. This resonator may be a two pole Infinite Impulse Response ("IIR") filter, as described below in additional detail. Notably, because the derivative of a sinusoid is a sinusoid, a resonator effectively may be used to produce first order derivatives of phase factor samples to provide seed samples for quadratic approximation of sinusoids.

Figure 8:
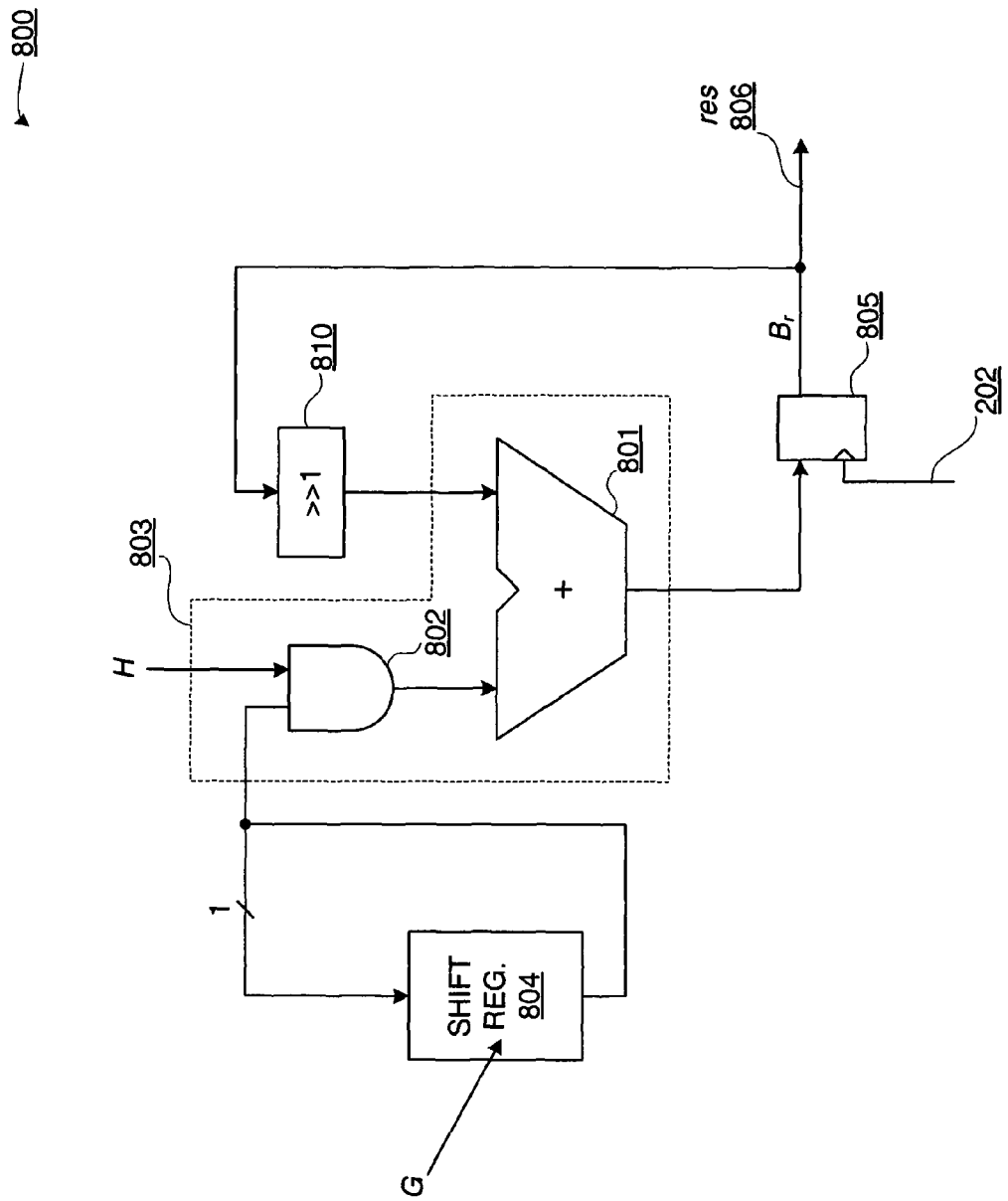
FIG. 8 is a block/schematic diagram depicting an exemplary embodiment of a bit-serial multiplier.

FIG. 8 is a block/schematic diagram depicting an exemplary embodiment of a bit-serial multiplier 800. Bit-serial multiplier 800 may map to an FPGA CLB, because for each bit the full adder 801 and AND gate 802 may be merged into one multi-input CLB, generally indicated as CLB 803.

Operand H is input to AND gate 802. Another input to AND gate 802 is output of shift register 804. Input and output of shift register 804 may be hardwired to form a loop. Thus, a one-bit shift may be hardwired such that only $B_r/2$ slices in a Xilinx FPGA embodiment may be used. Notably, flip-flop 805 is next to LUT 803 in all slices in a Xilinx FPGA. FPGA slices in a Xilinx FPGA may be configured as shift registers, such as 16-bit shift registers for example, to provide shift register 804. Such slice-configured shift registers may be cascaded to form a circular shift register, namely shift register 804, for holding operand G. In short, because G changes with changes to harmonic order, namely changes to K, it changes relatively infrequently, if ever, as compared with H which changes with each point output for y(z). Thus, values for G may be loaded into a shift register.

Output of AND gate 802 is input to full adder 801, and output of full adder 801 is provided as a data input to flip-flop 805, the output of which is $B_r$ bits, namely resolution signal 806. Notably, clock signal 202 is provided to a clock input port of flip-flop 805. Output of flip-flop 805 may be input to a bit shifter 810 for bit shifting to scale values of $B_r$ bits to be substantially greater than one. Output of bit shifter 810 may be provided as another input to full adder 801.

Notably, bit-serial multiplier 800 is either for sine or cosine only. For cosine and sine, two bit-serial multipliers may be used, where values for opA, which is k according to the function $k=2 \cos \omega_k$, may be loaded into a shared shift register. Moreover, to improve speed, full adder 801 may be split and partial results registered for pipelining. This effectively doubles the number of clock cycles of clock signal 202 for each output sample while allowing the evaluation of two independent multiplications in tandem.

Figure 9:
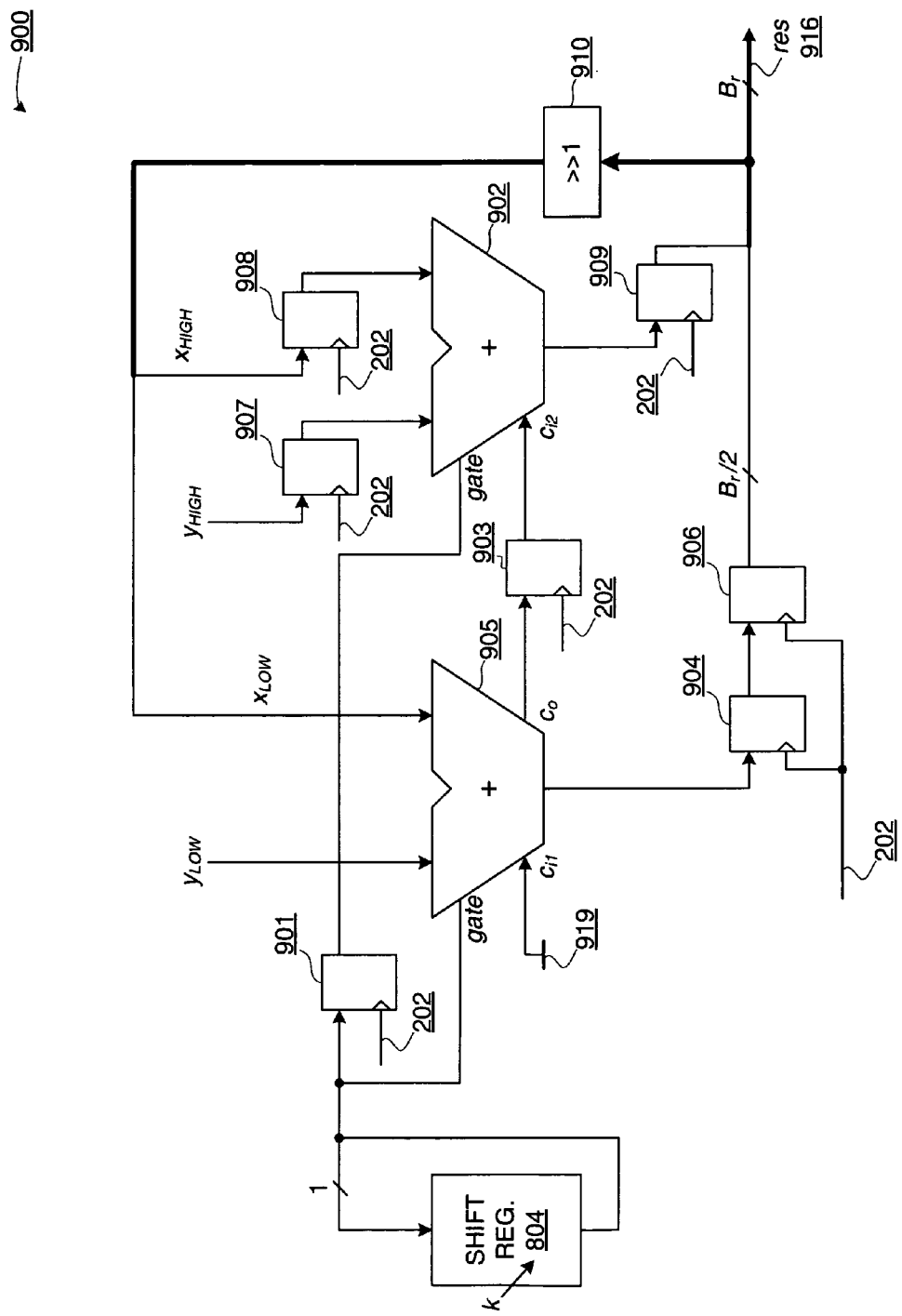
FIG. 9 is a block/schematic diagram depicting an exemplary embodiment of a pipelined bit-serial multiplier.

FIG. 9 is a block/schematic diagram depicting an exemplary embodiment of a pipelined bit-serial multiplier 900 for sine and cosine. Shift register 804 is cascaded to provide a 1-bit hardwired loop, as previously described with respect to FIG. 8, except that shift register 804 stores k in this configuration. Frequency word derivative k output from shift register 804 is provided as an input to flip-flop 901. Output of flip-flop 901 is provided as a control gate input to full adder 902. Output k from shift register 804 is provided as a control gate input to adder 905. An initial carry input, $c_{i1}$, may be provided as a carry input to full adder 905, which carry input may be tied to logic low reference voltage 919. Carry output, $c_o$, from adder 905 is provided as data input to flip-flop 903, and output of flip-flop 903 is provided to adder 902 as a carry input, $c_{i2}$.

To improve operating speed, namely to allow for higher clock rates, operand y can be broken into a lower and a higher word: $y=[y_{high}, y_{low}]$. An input to adder 905 is operand $y_{low}$. Output of adder 905 is provided as an input to flip-flop 904. Output of flip-flop 904 is provided as an input to flip-flop 906. Output of flip-flop 906 is $B_r/2$ bits for a partial product.

An input to adder 902 is operand $y_{high}$ as output after being registered in flip-flop 907 and clocked out responsive to clock signal 202. An output from adder 902 is provided to a data input of flip-flop 909. Output of flip-flop 909 and output of flip-flop 906 are each $B_r/2$ bits for respective partial products, which in combination provide $B_r$ bits for resolution signal 916. Outputs of flip-flops 906 and 909 may be provided in parallel to one or more bit shifters 910 for bit shifting to the right by 1 bit. Again, to improve operating speed, namely to allow for higher clock rates, operand x can be broken into a lower and a higher word: $x=[x_{high}, x_{low}]$. Output of bit shifter 910 may respectively be provided as an $x_{high}$ data input to flip-flop 908 and as an $x_{low}$ input to adder 905. Output of flip-flop 908 may be provided as an input to adder 902. Each of flip-flops 901, 903, 904, 906, 907, 908, and 909 may be clocked responsive to a clock signal, such as clock signal 202. It should be appreciated that multiplication of $k_1$ with $y_1$ and $k_2$ with $y_2$ in $2B_k$ clock cycles, for $B_k$ being the number of bits representing constant k in shift register 804, may be done. Thus, circular shift register 804 holding k may store $k_1$ and $k_2$ in a bit-interlaced configuration, and a y operand may be set equal to $y_1$ for even values and $y_2$ for odd values of clock cycles. If $k_2=k_1=k$, then bits of k at the output of circular shift register 804 may have to be available for two clock cycles of clock signal 202.

Accordingly, for an initial iteration, $y_{1low}$, is used for $y_{low}$, and $y_{high}$ is a "don't care condition," where a subscript 1 is used to indicate sine. On a second iteration, $y_{low}$ is $y_{2low}$ and $y_{high}$ is $y_{1high}$, where a subscript 2 is used to indicate cosine. On a third iteration, $y_{low}$ is $y_{1low}$ and $y_{high}$ is $y_{2high}$, and so on. The sequence for $x_{low}$ and $x_{high}$ is similar to the sequence for $y_{low}$ and $y_{high}$.

Figure 10:
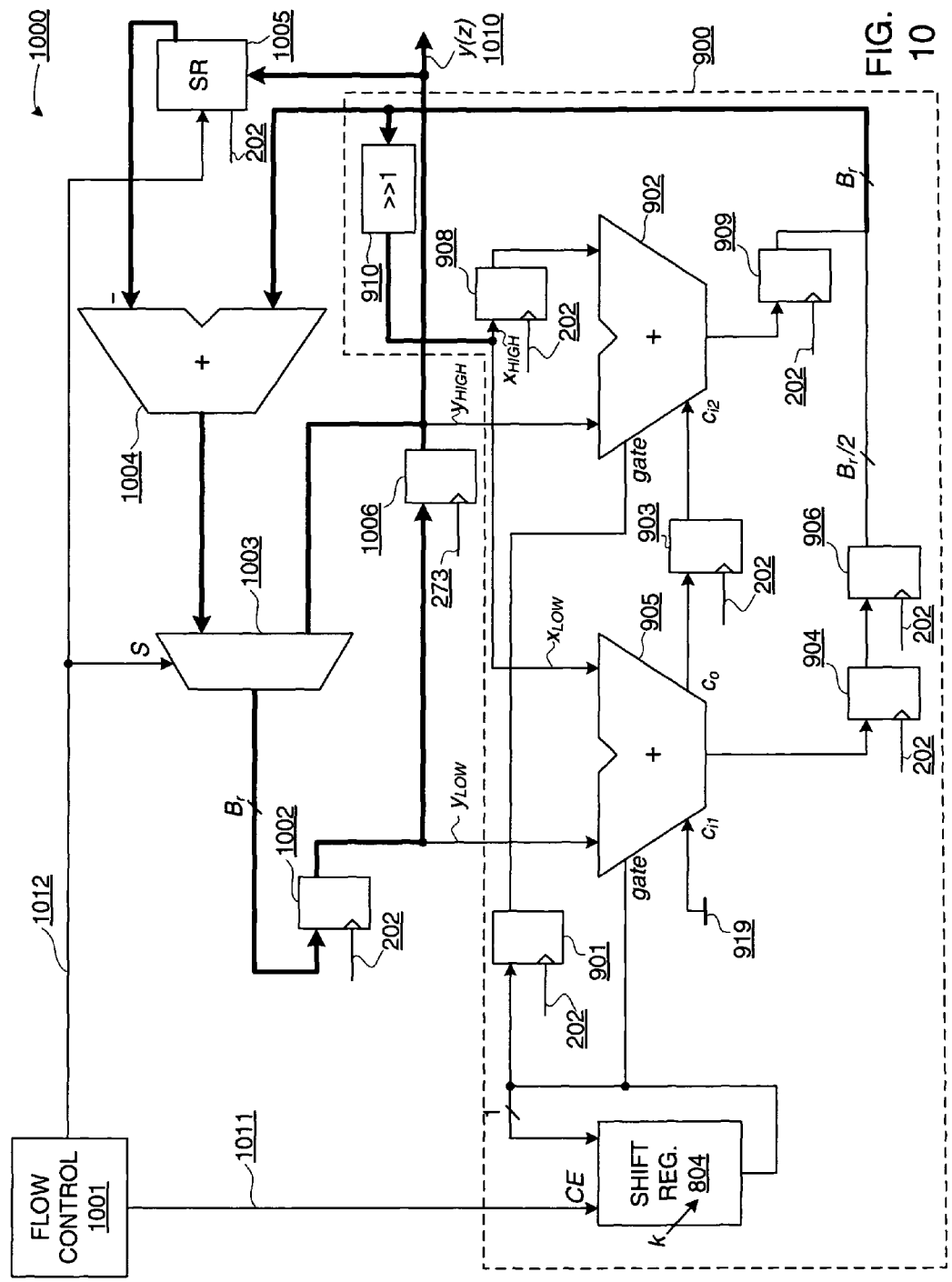
FIG. 10 is a block/schematic diagram depicting an exemplary embodiment of a pipelined bit-serial resonator.

FIG. 10 is a block/schematic diagram depicting an exemplary embodiment of a pipelined bit-serial resonator 1000. Resonator 1000 is a two-stage pipelined resonator with a pipelined bit-serial multiplier 900. As pipelined bit-serial multiplier 900 has been previously described, such description is not repeated here for purposes of clarity. However, as mentioned above to improve speed, full adder 801 of FIG. 8 may be split and partial results registered for pipelining as in FIG. 9. Although this effectively doubles the number of clock cycles of clock signal 202 for each output sample while allowing the evaluation of two independent multiplications in tandem.

Pipelining may impact the transfer function of the resonator circuit as well. However, with multiple correctly initialized registers, throughput may be increased and a stable transfer function may be maintained. A resonator with p pipeline stages may be thought of as a structure that evaluates p different resonators, all sharing the same frequency, but where amplitude and initial phase may be selected. Frequency among the resonators is the same, as they share the same value for k Initial values in the pipeline registers may be used to ensure uniform amplitude and phase alignment between multiple resonators.

Flow control 1001 provides a clock enable signal 1011 to shift register 804 and a clock enable signal 1012 to shift register 1005. Shift register 1005 may be formed of two flip-flops One register of flip-flop 1005 is for sine and the other register of flip-flop 1005 is for cosine. Additionally, such clock enable signal 1012 provided to flip-flop 1005 is provided as a control select input to multiplexer 1003. Accordingly, the control select signal provided to multiplexer 1003 is S, as described elsewhere herein with reference to Equation 3.

Output of multiplexer 1003, which is $B_r$ bits for each word, is provided to flip-flop 1002. A portion of the output of flip-flop 1002 is provided as an operand $y_{low}$ input to adder 905 of pipelined bit-serial multiplier 900. The output of flip-flop 1002 is provided as an input to flip-flop 1006. Flip-flop 1006 replaces flip-flop 907 of pipelined bit-serial multiplier 900 of FIG. 9. Notably, flip-flops 1002 and 1006 may be clocked responsive to clock signal 202. A portion of the output of flip-flop 1006 is provided as an operand $y_{high}$ to pipelined bit-serial multiplier 900. The output of flip-flop 1006 is provided as an input to multiplexer 1003 and as output 1010, namely y(z). Output of flip-flop 1006 is further provided as a data input to shift-register 1005. Output of shift-register 1005, which holds two consecutive samples, is provided to a subtraction port of full adder ("subtractor") 1004. Flip-flop 1006 may be clocked responsive to a clock signal 273 with frequency $1/B_k$ of main clock signal 202. Output of subtractor 1004 is provided as an input to multiplexer 1003.

Registered outputs of adders 902 and 905 of pipelined bit-serial multiplier 900 are provided as an input to subtractor 1004 as well as to bit shifter 910 as previously described.

For example, assuming $B_k$ is set to 63, resulting to k being represented in a 63.61 bit fixed point format, pipelined bit-serial multiplier 900 of FIG. 10 calculates $ky_1$ and $ky_2$ in $2(B_k+1)$ clock cycles, which in this example may be 128 clock cycles. During multiplication, multiplexer 1003 continues circulating of $y_1$ and $y_2$ as inputs to flip-flop 1002. Meanwhile, circular shift register 804 supplies a bit of k, such as from a least significant bit ("LSB") to a most significant bit ("MSB") in every second clock cycle. Thus at clock cycles 126 and 127, $ky_1$ and $ky_2$ are ready to be latched into registers, namely flip-flops 1002 and 1006, via multiplexer 1003 set responsive to S. At clock cycles 126 and 127, operands $y_1$ and $y_2$, respectively, are latched into shift register 1005. The registers of 1005, subtractor 1004, multiplier 900 along with registers 1002 and 1006 form a transfer function of the resonator. Resonators are filters with a transfer function equal to the z-transform of a sine or cosine function. Stimulated by $\delta(t)$, a filter generates a sine or a cosine function. The z-transform of $\sin(\omega_0 n)$ is $$y(z) \frac{z^{-1} \sin \omega_0}{1 - 2z^{-1} \cos \omega_0 + z^{-2}}. \quad (15)$$

This equation may be realized as $$y(z) = x(z)H(z) \text{ where} \quad (16)$$

$$x(z) = \delta(z)e^{j\varphi 0}$$

$$H(z) = \frac{z^{-1}}{1 - 2z^{-1}\cos \omega_0 + z^{-2}},$$

namely the transfer function. Notably, this is a two-pole filter or resonator. Because such a filter contains only one constant coefficient multiplier, namely $k=2 \cos \omega_0$, it is suitable for FPGA implementation. Furthermore, the transfer function has a property with respect to constraining poles to lie on a unit circle, given that $-2<k<2$.

Also, during the last two clock cycles, namely clock cycles 126 and 127 where the initial clock cycle is clock cycle 0, registers holding partial product results, namely flip-flops 904, 906, 908, and 909, may be re-initialized either by dedicated logic available in CLBs or by forcing the output of adders 905 and 902 to an initial value for two clock cycles.

When the $B_k+B_r$ bits-wide result is fed back to delay registers, namely flip-flops 1002 and 1006, $B_k$ bits are dropped. Initialization to a non-zero value allows rounding of multiplier results. Alternatively, the result may be simply truncated. However, an average of −½ LSB error would be inserted with each resonator output sample. Accordingly, due to such an accumulating error, resonator 1000 output would quickly diverge. The noise and bias inserted by this truncation may be reduced by initializing contents of register 904 to value 0.5, such as may be represented as 10000 . . . 00 in a $B_k$ bits-wide word.

If $y_1(0)$ and $y_2(0)$ are chosen such that the former is equal to 0 and the latter is equal to 1, then resonator 1000 may generate quadrature signals in every 128 clock cycles. In this configuration, resonator 1000 may replace block RAM used for storage 560 in FIG. 5.

Interpolators 510-C and 510-S of FIG. 5 when combined with resonator 1000 have a constant interpolation length, which is equal to the sample rate conversion. This is due to the fact that the input sample rate is fixed by the representation of k in resonator 1000. Notably, resonator 1000 does not need any addressing signals in contrast to the embodiment illustratively shown in FIG. 5. This facilitates merging components of flow control 552 of FIG. 5 into differentiator-integrator blocks 510-C and 510-S, as well as resonator 1000. Notably, block 510-C is a cosine interpolator and block 510-S is a sine interpolator.

Figure 11:
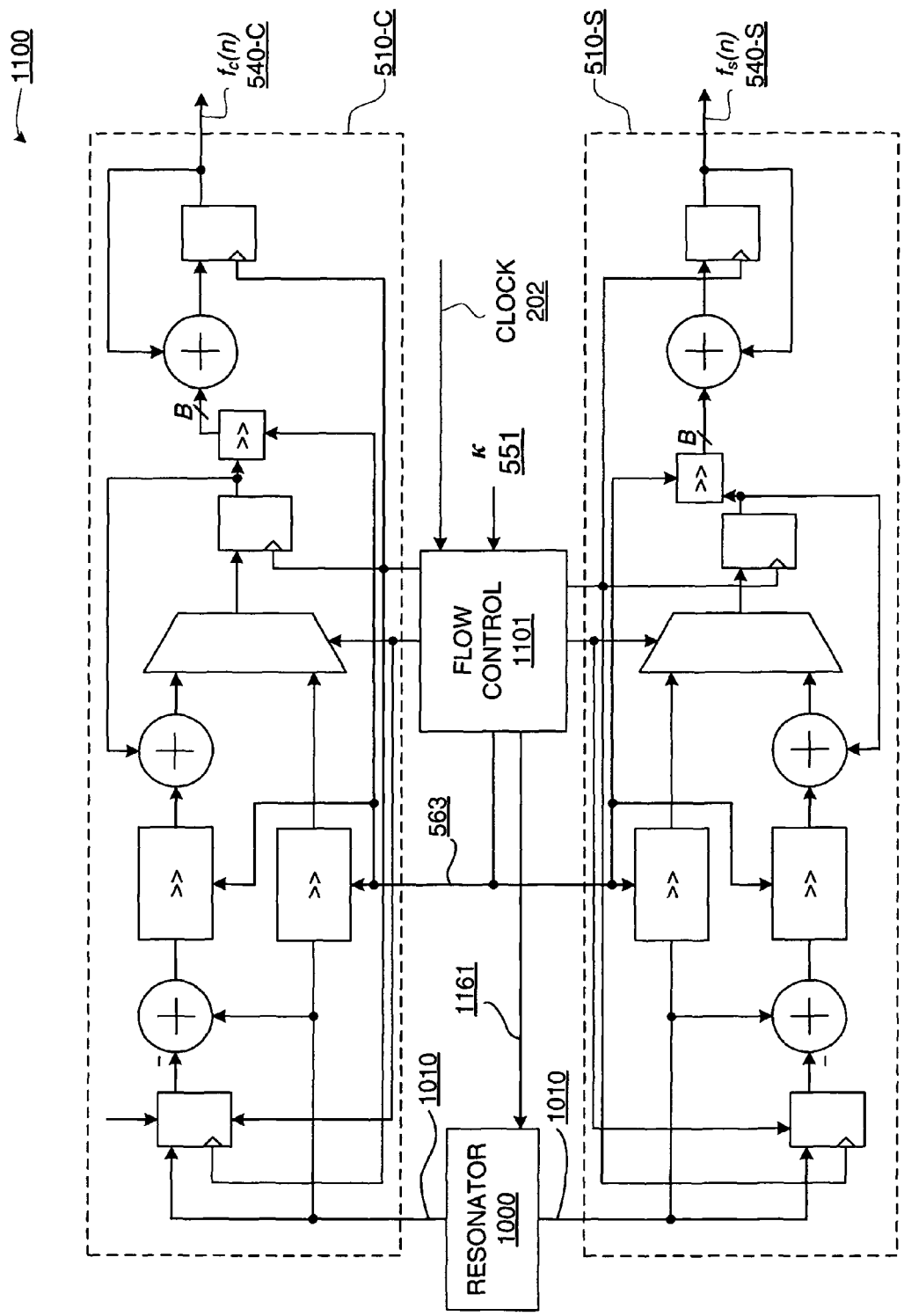
FIG. 11 is a block diagram depicting an exemplary embodiment of a pipelined interpolator for complex sinusoids.

FIG. 11 is a block diagram depicting an exemplary embodiment of a pipelined interpolator system 1100 for complex sinusoids. Pipelined interpolator system 1100 is the same as in-place interpolator system 500 of FIG. 5, except that storage 560 has been replaced with resonator 1000. Accordingly, address signals 561 and 562 are replaced with a frequency word-derived signal 1161 for k. Furthermore, output signal 1010 from resonator 1000 is a generated signal responsive to k, and thus responsive to k. Output signal 1010 is provided to each interpolator block 510-S and 510-C instead of a seed sample obtained from a LUT as in FIG. 5.

Pipelined interpolator system 1100 includes flow control 1101. Flow control 1101 may be implemented as a single multiple-bit counter, such as a seven-bit counter for the above example, with two gates for signaling clock cycles $2B_k$ and $2B_k+1$ and may include a LUT having values for converting k input to k according to the function $k=2 \cos \omega_k$, as well as LUTs holding initialization values for different registers. Flow control 1101 is used to control multiplexer 1003 of resonator 1000 of FIG. 10, as well as to load integrators of differentiator-integrator blocks 510-C and 510-S. Furthermore, flow control 1101 may be used to enable register loading in resonator 1000 responsive to converting k input to k output for resonator 1000, as well as initializing partial products with a ½ LSB rounding constant.

Notably, noise is introduced by algorithmic approximation and arithmetic errors. The approximation error is a function of the sinusoid period length (N) and the uniform interpolation length (S). Generally if S is increased, the second order approximation deviates more, which results in increased noise. If N is increased, but S is held constant, B and M grow proportionally. Thus, the approximation noise is reduced, and SNR and SFDR increase as sinusoid sections to be interpolated generally flatten out.

Figure 12:
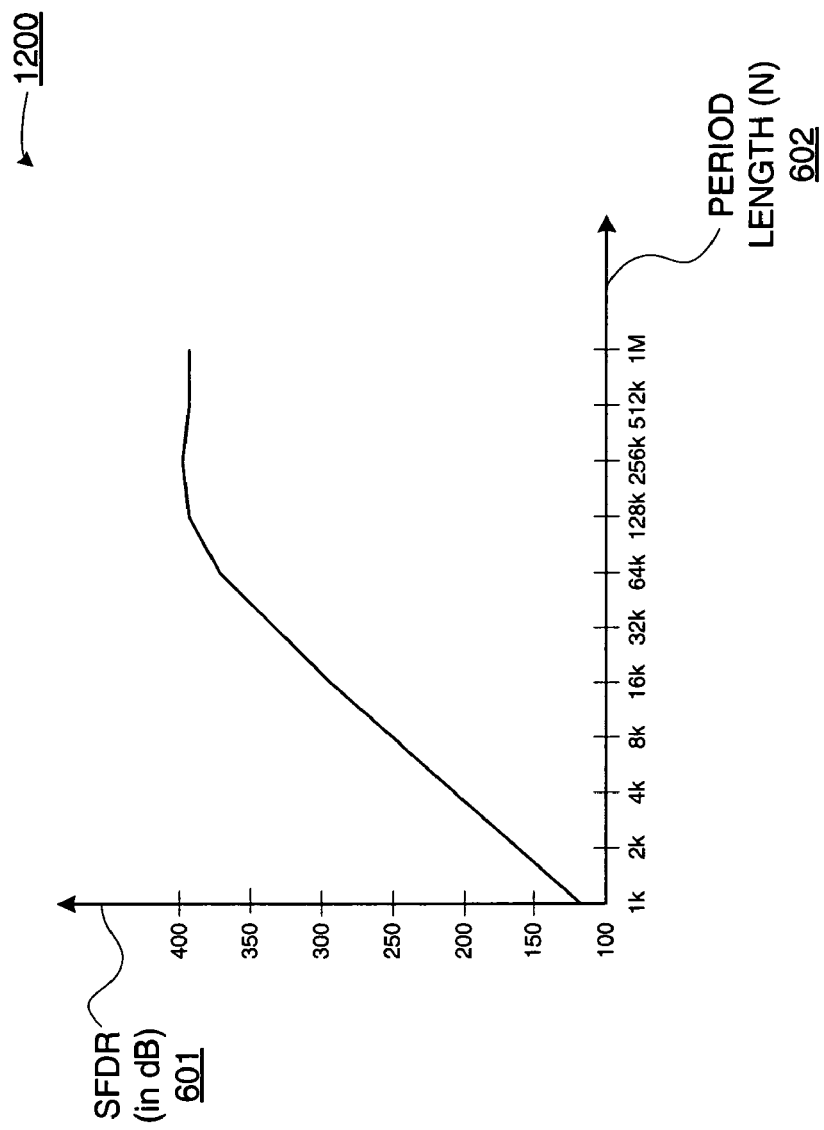
FIG. 12 is a graph depicting the relationship between SFDR and period length as simulated for the pipelined interpolator of FIG. 11.
Figure 13:
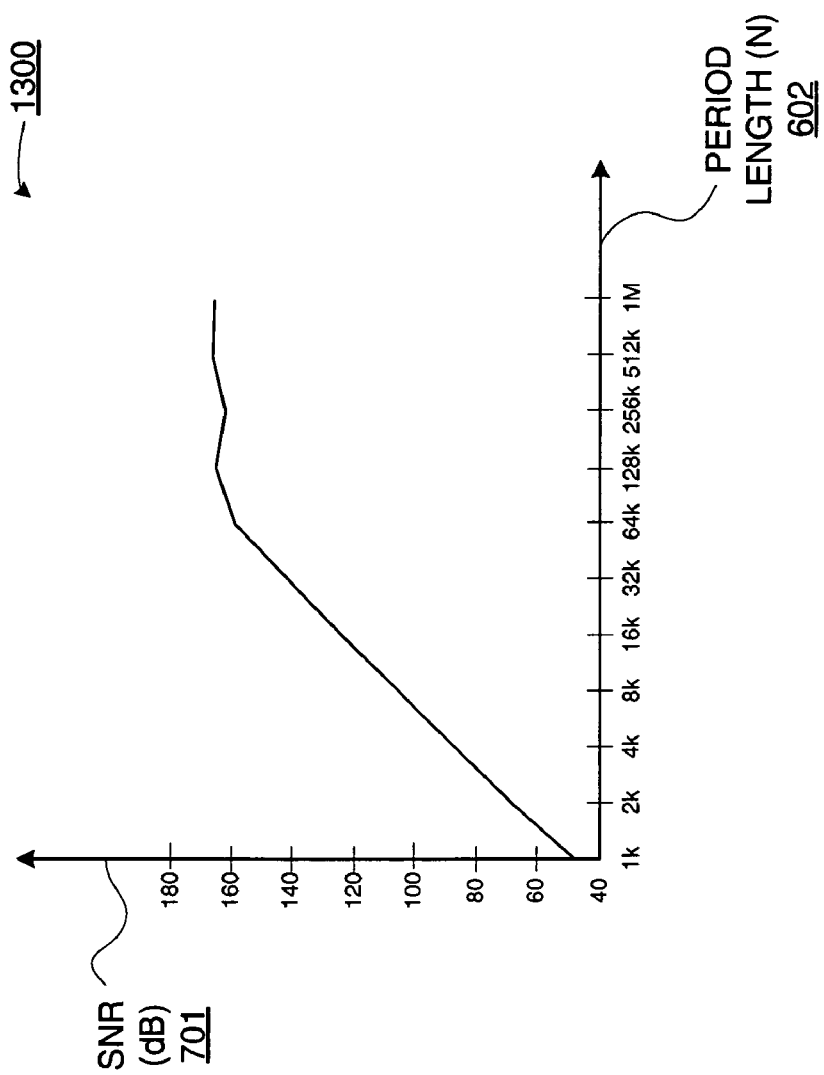
FIG. 13 is a graph depicting the relationship between SNR and period length as simulated for the pipelined interpolator of FIG. 11.

Arithmetic errors may be introduced by a resonator or integrators in interpolator system 1100, such as illustratively shown in FIG. 11. Such errors may be introduced in instances where not all extra bits generated by the multiplication are withheld. FIGS. 12 and 13 are graphs depicting respective embodiments of SFDR and SNR profiles 1200 and 1300 as simulated for interpolator system 1100 of FIG. 11. Interpolator system 1100 for this simulation was fed by a LUT-based $1/128^{th}$ sample-rate sinusoidal source quantized to 36 bits, which held bit-true results from a resonator for this simulation. Noise introduced by resonator 1000 may be controlled at least in part by proper selection of $B_k$ and $B_r$. Notably, selection of $B_k$ is not arbitrary, since $2(B_k+1)=S=2^{Bs}$. Increasing S is constrained by interpolation error. Decreasing $B_k$ is constrained by arithmetic error introduced by resonator 1000 of FIG. 10. Thus, practical values for S may be 32, 64, or 128, from which values for $B_k$ may be 15, 63, and 127. As $B_k=15$ may be prohibitively small to represent k for an SFDR greater than 150 dB, the advantages of representing $B_k$ using 127 bits may be outweighed by the disadvantages of a doubled interpolation length. Accordingly, $B_k$ equal to 63 may be selected.

After $B_k$ is assigned, $B_r$ may be estimated by $$SNR \approx 7.5B - 170 \text{ db}, \quad (18)$$

as $B_r \leq B_k$. Notably, resonator 1000 of FIG. 10 may insert less noise than a LUT as in FIG. 5 where there is a 36-bit quantization, namely SNR=218.7 for the above example, and thus $B_r > 52$.

Selecting both $B_r = B_k = 63$ may result in magnitude of resonator noise that is orders smaller than quantization noise introduced by the interpolator, which may in turn allow the generalization of noise characteristics being attributed to the interpolated resonator.

Two architectures have been presented to generate phase factor for high-point-size FFTs. For in-place hardware FFTs with dynamic access to phase factor series $W_N^n$, $W_N^{2n}$, $W_N^{4n}$, ... 1, a LUT-based continuous quadratic interpolator solution may be used. In this configuration, a single block RAM may be used along with six 36-bit adders for implementation in an FPGA. For pipelined FFT solutions, with static phase-factor source for each rank, samples may be obtained from a single block RAM with coarse-rotation logic. Such a solution may be implemented in FPGAs for all ranks with $N/k \leq 2048$. For $N/k > 2048$, a block RAM count would quickly escalate. Accordingly, a digital resonator may be employed instead of the block RAM as a primary, low-sample rate sinusoid source refined by continuous quadratic interpolating stages. For an FPGA implementation, four 32-bit adders, six 36-bit adders, and three multiplexers may be sufficient for an implementation generating phase factors for FFTs ($N > 2^{15}$) with high spectral clarity (SNR>150 dB).

By comparing FIGS. 6 and 12 and FIGS. 7 and 13, it may be appreciated that SFDR and SNR for an in-place FFT interpolator system 500 of FIG. 5 is more suitable for FFTs with point sizes up to $N \leq 2^{17}$. Moreover, by such comparisons, it may be appreciated that SFDR and SNR for a pipelined interpolator system 1100 of FIG. 11 is more suitable for longer period lengths.

While the foregoing describes exemplary embodiment(s) in accordance with one or more aspects of the invention, other and further embodiment(s) in accordance with one or more aspects of the invention may be devised without departing from the scope thereof, which is determined by the claim(s) that follow and equivalents thereof. For example, it should be appreciated that the above described FFT phase-factor generator architecture has been described in terms of implementation in an FPGA. Accordingly, FPGA resources have been described for such implementation. However, it should be understood that an FFT phase-factor generator architecture as described herein is not limited to FPGAs, but may be used in any Very Large-Scale Integration ("VLSI") integrated circuit for implementation, or as a stand-alone sine, cosine, or sinusoid generator, or as Digital Direct Synthesizer, among other applications. Furthermore, even though specific numerical examples were used for purposes of clarity by way of example, it should be appreciated that other numerical values for implementations may be used. Moreover, for purposes of clarity, single instances of circuits and signal lines have been illustratively shown throughout several figures of the drawings; however, it should be appreciated that multiple instances of such circuits and signal lines may be implemented responsive to data bit widths being processed. Claim(s) listing steps do not imply any order of the steps. Trademarks are the property of their respective owners.

What is claimed is:

1. An interpolator configured to provide a quadratic approximation of a sinusoid, comprising:
   a sample source for providing first order derivatives of sub-sampled sets of phase factor samples;
   a flow controller coupled to receive an index input for selecting a harmonic order, and configured to provide signaling responsive in part to the index input;
   the sample source coupled to the flow controller and configured to provide phase factor information responsive to the signaling;
   a first differentiator coupled to receive the first order derivatives from the sample source and configured to provide second order derivatives of the first order derivatives;
   a first scaling device coupled to receive the first order derivatives from the sample source;
   a second scaling device coupled to receive the second order derivatives from the first differentiator;
   a first integrator coupled to receive output from the first scaling device and to receive output from the second scaling device;
   a third scaling device coupled to receive output from the first integrator; and
   a second integrator coupled to receive output from the third scaling device.

2. The interpolator according to claim 1, wherein:
   the sample source includes a phase factor sample source;
   the phase factor sample source is a first memory having stored therein the sub-sampled sets of phase factor samples; and
   each of the sub-sampled sets of phase factor samples is for a respective order of a harmonic of a sinusoid.

3. The interpolator according to claim 2, wherein:
   the first differentiator includes a second register coupled to a second subtractor;
   the second register and the second subtractor are each coupled to receive the first order derivatives; and
   the second register is configured to respectively provide a first order derivative obtained from the first order derivatives to the second subtractor responsive to the Mth cycle of the clock signal.

4. The interpolator according to claim 2, wherein:
   the sample source includes a phase factor derivative source; and
   the phase factor derivative source is a second memory coupled between the first memory and the first differentiator;
   the second memory having stored therein the first order derivatives of the sub-sampled sets of phase factor samples; and
   the second memory coupled to receive the sub-sampled sets of phase factor samples and configured to provide the first order derivatives thereof.

5. The interpolator according to claim 4, wherein the first order derivatives are for sinusoids having a constant initial phase; and
   wherein the first memory and the second memory are configured as respective look-up tables.

6. The interpolator according to claim 1, wherein the sample source is a resonator.

7. The interpolator according to claim 6, wherein the resonator is a pipelined bit-serial resonator.

8. A sine and cosine interpolator configured to provide a quadratic approximation, comprising:
   a first interpolator block configured to provide a cosine function output;
   a second interpolator block configured to provide a sine function output;
   a sample source coupled to the first interpolator block and the second interpolator block;
   a flow controller coupled to the first interpolator block and the second interpolator block;
   the flow controller coupled to receive an index input for selecting a harmonic order, and configured to provide signaling responsive in part to the index input;
   the sample source coupled to the flow controller and configured to provide phase factor information responsive to the signaling;
   each of the first interpolator block and the second interpolator block comprising:
      a differentiator coupled to receive output from the sample source to provide a derivative of the phase factor information;
      a first scaling device coupled to receive the phase factor information;
      a second scaling device coupled to receive the derivative;
      a first integrator coupled to receive output from the first scaling device and to receive output from the second scaling device;
      a third scaling device coupled to receive output from the first integrator; and
      a second integrator coupled to receive output from the third scaling device.

9. The interpolator according to claim 8, wherein the sample source is a resonator.

10. The interpolator according to claim 9, wherein the resonator is a pipelined bit-serial resonator.

11. The interpolator according to claim 10, wherein the pipelined bit-serial resonator includes a multiplier.

12. The interpolator according to claim 11, wherein the multiplier is a pipelined bit-serial multiplier.

13. The interpolator according to claim 12, wherein the interpolator is implemented in programmable logic.

14. The interpolator according to claim 13, wherein the programmable logic is of a Field Programmable Gate Array.

15. The interpolator according to claim 8, wherein the sample source is a memory, the signaling being address signaling for addressing the memory.

16. The interpolator according to claim 15, wherein the memory is configured as a look-up table, the look-up table having pre-calculated sets of first order derivatives of phase factors sub-sampled for different orders of harmonics of sinusoids.

17. The interpolator according to claim 16, wherein the derivative of each of the first and second interpolator blocks is a respective second order derivative of a first order derivative obtained from the sets of first order derivatives.

18. An interpolator configured to provide a quadratic approximation of a sinusoid, comprising:
   sample source means for providing first order derivatives of sub-sampled sets of phase factor samples;
   flow controller means coupled to receive an index input for selecting a harmonic order, and configured to provide signaling responsive in part to the index input;
   the sample source means coupled to the flow controller and configured to provide phase factor information responsive to the signaling;
   first differentiator means coupled to receive the first order derivatives from the sample source means for providing second order derivatives of the first order derivatives;
      first scaling means coupled to receive the first order derivatives from the sample source means for bit shifting the first order derivatives;
   second scaling means coupled to receive the second order derivatives from the first differentiator for bit shifting the second order derivatives;
   first integrator means coupled to receive output from the first scaling means and to receive output from the second scaling means for providing a first accumulation;
   third scaling means coupled to receive the first accumulation from the first integrator means for bit shifting the first accumulation; and
   second integrator means coupled to receive output from the third scaling means for providing a second accumulation.

19. The interpolator according to claim 18, wherein the sample source means includes a memory configured as a look-up table.

* * * * *